(12) United States Patent
Yu et al.

(10) Patent No.: US 12,003,466 B2
(45) Date of Patent: Jun. 4, 2024

(54) RESOURCE ALLOCATION METHOD AND DEVICE IN TDD SYSTEM

(71) Applicant: HUAWEI TECHNOLOGIES CO., LTD., Guangdong (CN)

(72) Inventors: Zheng Yu, Beijing (CN); Wenping Bi, Shenzhen (CN); Yue Zhao, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 597 days.

(21) Appl. No.: 17/172,188

(22) Filed: Feb. 10, 2021

(65) Prior Publication Data

US 2021/0167938 A1 Jun. 3, 2021

Related U.S. Application Data

(63) Continuation of application No. PCT/CN2018/100095, filed on Aug. 10, 2018.

(51) Int. Cl.
*H04L 5/00* (2006.01)
*H04L 5/26* (2006.01)
(Continued)

(52) U.S. Cl.
CPC .............. *H04L 5/26* (2013.01); *H04L 5/0044* (2013.01); *H04W 28/20* (2013.01); *H04W 72/0446* (2013.01); *H04W 72/23* (2023.01)

(58) Field of Classification Search
None
See application file for complete search history.

(56) References Cited

U.S. PATENT DOCUMENTS

2014/0204879 A1 7/2014 Yang et al.
2019/0110307 A1* 4/2019 Kim .................. H04W 74/0808

FOREIGN PATENT DOCUMENTS

CN 101867882 A 10/2010
CN 106464479 A 2/2017

OTHER PUBLICATIONS

Sharp, "On more flexible PDSCH/PUSCH resource allocation" 3GPP TSG RAN WG1 Meeting #93 R1-1806938, Busan, Korea, May 21-25, 2018, 5 pages.

(Continued)

*Primary Examiner* — Minh Trang T Nguyen
(74) *Attorney, Agent, or Firm* — Fish & Richardson P.C.

(57) ABSTRACT

Example resource allocation methods and apparatus are described. One example method includes that a terminal device receives downlink control information sent by a network device, where the downlink control information includes a resource allocation field, the resource allocation field includes formula (I)+5 bits. The terminal device determines the first resource indication value, and determines, based on the first resource indication value, a starting resource block allocated in the uplink bandwidth and a length L CRP, s of consecutive resource blocks allocated in the uplink bandwidth, where $M \leq L_{CRBs} \leq 6$, and M is a positive integer greater than 1. The terminal device sends data on resources corresponding to the starting resource block and the length of the consecutive resource blocks. The methods and the devices provided in the embodiments of this application may be used in a communications system, for example, V2X, V2V, the Internet of Vehicles, MTC, DE-M, M2M, or the Internet of Things.

20 Claims, 7 Drawing Sheets

(51) Int. Cl.
  *H04W 28/20* (2009.01)
  *H04W 72/0446* (2023.01)
  *H04W 72/23* (2023.01)

(56) References Cited

OTHER PUBLICATIONS

3GPP TS 36.212 V15.2.1 (Jul. 2018), 3rd Generation Partnership Project, Technical Specification Group Radio Access Network, Evolved Universal Terrestrial Radio Access (E-UTRA), Multiplexing and channel coding(Release 15), 245 pages.
3GPP TS 36.101 V15.3.0 (Jun. 2018), 3rd Generation Partnership Project; Technical Specification Group Radio Access Network, Evolved Universal Terrestrial Radio Access (E-UTRA), User Equipment (UE) radio transmission and reception(Release 15), 1694 pages.
3GPP TS 36.213 V15.2.0 (Jun. 2018), 3rd Generation Partnership Project; Technical Specification Group Radio Access Network; Evolved Universal Terrestrial Radio Access (E-UTRA); Physical layer procedures(Release 15), 541 pages.
Ericsson, "Flexible PDSCH/PUSCH starting PRB for MTC" 3GPP TSG-RAN WG1 Meeting #92bis, R1-1804125, Sanya, Peoples Republic of China, R1-1804125, Feb. 16-Apr. 20, 2018, 14 pages.
3GPP TS 36.300 V15.2.0 (Jun. 2018), 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2(Release 15), 357 pages.
3GPP TS 36.331 V15.2.2 (Jun. 2018), 3rd Generation Partnership Project, Technical Specification Group Radio Access Network, Evolved Universal Terrestrial Radio Access (E-UTRA), Radio Resource Control (RRC), Protocol specification (Release 15), 791 pages.
PCT International Search Report and Written Opinion in International Application No. PCT/CN2018/100095, dated Apr. 28, 2019, 17 pages (With English Translation).
Extended European Search Report issued in European Application No. 18929286.5, dated Jun. 22, 2021, 13 pages.
Intel Corporation, "Resource allocation and TBS," 3GPP TSG RAN WG1 Meeting #90bis, R1-1717393, Prague, Czech Republic, Oct. 9-13, 2017, 13 pages.
Motorola Mobility, "Introduction of even further enhanced MTC for LTE in 36.213, s08-s09," 3GPP TSG RAN WG1 Meeting #93, R1-1807938, Busan, Korea, May 21-25, 2018, 143 pages.
Office Action issued in Chinese Application No. 201880096557.6 dated Sep. 27, 2021, 10 pages.

\* cited by examiner

RESOURCE ALLOCATION METHOD AND DEVICE IN TDD SYSTEM

CROSS-REFERENCE TO RELATED APPLICATIONS

This application is a continuation of International Application No. PCT/CN2018/100095, filed on Aug. 10, 2018, the disclosure of which is hereby incorporated by reference in its entirety.

TECHNICAL FIELD

Embodiments of this application relate to the communications field, and in particular, to a resource allocation method and a device in a time division duplex (Time Division Duplexing, TDD) system.

BACKGROUND

Currently, large-scale application and deployment of a wireless communications system can provide various types of communication, for example, voices, data, and multimedia services, for a plurality of users.

During discussion of a current long term evolution (Long Term Evolution, LTE) technology, a current LTE system can support a machine type communication (Machine Type Communication, MTC) service.

Resources in the LTE system are divided into subcarriers in frequency domain, and are divided into subframes in time domain. One physical resource block (Physical resource block, PRB) includes 12 subcarriers in frequency domain, and is one slot in time domain. A subcarrier spacing in the LTE system is usually 15 kHz.

In the LTE system, user equipment (User Equipment, UE) that can support an MTC service is bandwidth-reduced low-complexity UE (Bandwidth-reduced Low-complexity UE, BL UE) or coverage enhancement UE (Coverage Enhancement UE, CE UE). For an MTC device, frequency resources are divided into one or more narrowbands (narrowband), and one narrowband includes six consecutive and non-overlapping physical resource blocks. The LTE system provides two coverage enhancement modes for the coverage enhancement UE, that is, a coverage enhancement mode A (CE mode A) used for a relatively small coverage enhancement level and a coverage enhancement mode B (CE mode B) used for a relatively large coverage enhancement level.

When a quantity of resource blocks allocated by a base station to the bandwidth-reduced low-complexity UE or the coverage enhancement UE is less than or equal to 6, the base station may allocate the resources to the UE based on a resource allocation scheme of Rel-13 DCI format 6-0A. However, the to-be-allocated resources can only be allocated in the narrowband based on an uplink resource allocation type 0. Consequently, flexibility of resource allocation is greatly limited.

SUMMARY

Embodiments of this application provide a resource allocation method and a device in a TDD system, to implement resource allocation in the TDD system, and improve flexibility of resource allocation and resource utilization.

According to a first aspect, an embodiment of this application provides a resource allocation method in a TDD system, including:

receiving, by a terminal device, downlink control information sent by a network device, where the downlink control information includes a resource allocation field, the resource allocation field includes $$\left\lceil \log \left\lfloor \frac{N_{RB}^{UL}}{6} \right\rfloor \right\rceil + 5 \text{ bits,}$$

and $N_{RB}^{UL}$ indicates a quantity of resource blocks included in an uplink bandwidth, where when the resource allocation field indicates, based on a first resource allocation scheme, resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for the terminal device, and a length of consecutive resource blocks allocated in the narrowband is N, where $1 \leq N \leq 6$; or when the resource allocation field indicates, based on a second resource allocation scheme, resource allocation in the uplink bandwidth, the $$\left\lceil \log_2 \left\lfloor \frac{N_{RB}^{UL}}{6} \right\rfloor \right\rceil + 5 \text{ bits}$$

of the resource allocation field indicate a first resource indication value;

when the terminal device determines, based on the second resource allocation scheme, resources allocated by the network device, determining, by the terminal device, the first resource indication value based on the resource allocation field;

determining, by the terminal device based on the first resource indication value, a starting resource block allocated in the uplink bandwidth and a length $L_{CRBs}$ of consecutive resource blocks allocated in the uplink bandwidth, where $M \leq L_{CRBs} \leq 6$, and M is a positive integer greater than 1; and sending, by the terminal device, data on resources corresponding to the starting resource block and the length of the consecutive resource blocks.

According to a second aspect, an embodiment of this application further provides a resource allocation method in a TDD system, including:

determining, by a network device, a resource allocation scheme and a resource allocation field in downlink control information, where the resource allocation field includes $$\left\lceil \log_2 \left\lfloor \frac{N_{RB}^{UL}}{6} \right\rfloor \right\rceil + 5 \text{ bits},$$

and $N_{RB}^{UL}$ indicates a quantity of resource blocks included in an uplink bandwidth, where when the network device determines to perform resource allocation in a first resource allocation scheme, the resource allocation field indicates, based on the first resource allocation scheme, resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for the terminal device, and a length of consecutive resource blocks allocated in the narrowband is N, where 1≤N≤6; or when the network device determines to perform resource allocation in a second resource allocation scheme, the resource allocation field indicates, based on the second resource allocation scheme, resource allocation in the uplink bandwidth, and the $$\left\lceil \log_2 \left\lfloor \frac{N_{RB}^{UL}}{6} \right\rfloor \right\rceil + 5 \text{ bits}$$

of the resource allocation field indicate a first resource indication value, where the first resource indication value indicates a starting resource block allocated to the terminal device and a length $L_{CRBs}$ of consecutive resource blocks allocated to the terminal device, where M≤$L_{CRBs}$≤6, and M is a positive integer greater than 1:

sending, by the network device, the downlink control information to the terminal device; and receiving, by the network device on resources corresponding to the starting resource block and the length of the consecutive resource blocks, data sent by the terminal device.

In the foregoing embodiments of this application, the network device indicates, by using different values of bit states included in the resource allocation field, the resources allocated to the terminal device. The resource allocation field includes the $$\left\lceil \log_2 \left\lfloor \frac{N_{RB}^{UL}}{6} \right\rfloor \right\rceil + 5 \text{ bits}.$$

For example, the resource allocation field includes only the $$\left\lceil \log_2 \left\lfloor \frac{N_{RB}^{UL}}{6} \right\rfloor \right\rceil + 5 \text{ bits}.$$

The resource allocation field may indicate two different resource allocation schemes. When the first resource allocation field indicates, based on the first resource allocation scheme, the resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate the narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate the resource allocation in a narrowband for the terminal device, and the length of the consecutive resource blocks allocated in the narrowband is N, where 1≤N≤6. When the resource allocation field indicates, based on the second resource allocation scheme, the resource allocation in the uplink bandwidth, the $$\left\lceil \log_2 \left\lfloor \frac{N_{RB}^{UL}}{6} \right\rfloor \right\rceil + 5 \text{ bits}$$

of the resource allocation field indicate the first resource indication value, where the first resource indication value may be used by the terminal device to determine the starting resource block allocated in the uplink bandwidth and the length $L_{CRBs}$ of the consecutive resource blocks allocated in the uplink bandwidth, where m≤$L_{CRBs}$≤6, and M is a positive integer greater than 1. In the first resource allocation scheme, the narrowband is first indicated in the uplink bandwidth, and then the starting resource block and the length are indicated in the narrowband. In the second resource allocation scheme, the starting resource block and the length are indicated in the uplink bandwidth. Therefore, compared with the first resource allocation scheme, the second resource allocation scheme is more flexible, so that effective resources can be allocated to more UEs, and spectral efficiency is improved.

In a possible design of the first aspect or the second aspect, when the uplink bandwidth is six resource blocks, the resource allocation field indicates the resource allocation only in the first resource allocation scheme. Specifically, when the uplink bandwidth has only six RBs, the uplink bandwidth is 1.4 MHz. In this case, the uplink bandwidth includes only one narrowband. Therefore, for resource allocation in the uplink bandwidth of 1.4 MHz, the resource allocation field only needs to indicate the resource allocation in the first resource allocation scheme, so that a flexible starting PRB can be indicated. In other words, when the uplink bandwidth is six resource blocks, the second resource allocation scheme provided in the embodiments of this application may not be used. For example, the resource allocation may be performed based on a resource allocation scheme of Rel-13 DCI format 6-0A.

In a possible design of the first aspect or the second aspect, when the resource allocation field indicates, based on the second resource allocation scheme, the resource allocation in the uplink bandwidth, when the uplink bandwidth is 15 resource blocks, M=3; and/or when the uplink bandwidth is 25, 50, 75, or 100 resource blocks, M=2.

When the uplink bandwidth is 15 resource blocks, the terminal device determines the length $L_{CRBs}$ of the consecutive resource blocks indicated by the network device, where $3 \leq L_{CRBs} \leq 6$. For example, a value of the length of the consecutive resource blocks may be 3, 4, 5, or 6. When the uplink bandwidth is 25, 50, 75, or 100 resource blocks, the terminal device determines the length $L_{CRBs}$ of the consecutive resource blocks indicated by the network device, where $M \leq L_{CRBs} \times 6$, and M=2. For example, a value of the length of the consecutive resource blocks may be 2, 3, 4, 5, or 6.

In a possible design of the first aspect or the second aspect, when the resource allocation field indicates, based on the second resource allocation scheme, the resource allocation in the uplink bandwidth, when the uplink bandwidth is 15, 25, 50, 75, or 100 resource blocks, M=2.

When the uplink bandwidth is 15, 25, 50, 75, or 100 resource blocks, the terminal device determines the length $L_{CRBs}$ of the consecutive resource blocks indicated by the network device, where $2 \leq L_{CRBs} \leq 6$. For example, a value of the length of the consecutive resource blocks may be 2, 3, 4, 5, or 6. When the uplink bandwidth is 15 RBs, a value of $L_{CRBs}=3$ to 6 may be indicated by using an RIV value, and there is a total of 4*15=60 states. However, there are a total of 8 bits of the resource block allocation field that can indicate $2^8=64$ states, where the four more states can exactly indicate four states that cannot be indicated based on the resource allocation scheme of Rel-13 DCI format 6-0A when $L_{CRBs}=2$. In this way, changes to an RIV formula can be minimized, complexity of determining the RIV value by a base station can be reduced, complexity of determining a starting resource block and a length for resource allocation by a user based on the RIV value can be reduced, and flexibility of resource allocation can be improved.

In a possible design of the first aspect or the second aspect, when the uplink bandwidth is 25, 50, 75, or 100 resource blocks, the first resource indication value is equal to $N_{RB}^{UL}(L_{CRBs}-2)+RB_{START}$, where $N_{RB}^{UL}$ indicates the quantity of resource blocks included in the uplink bandwidth, $L_{CRBs}$ is the length of the allocated consecutive resource blocks, and $RB_{START}$ is an index of the allocated starting resource block.

When the uplink bandwidth is greater than 15 RBs, the first resource indication value is equal to $N_{RB}^{UL}(L_{CRBs}-2)+RB_{START}$. Therefore, $L_{CRBs}$ and $RB_{START}$ may be calculated based on the first resource indication value. Herein, that the first resource indication value is equal to $(L_{CRBs}-2)+RB_{START}$ is merely an example. A relationship between the first resource indication value and the three parameters: $N_{RB}^{UL}$, $L_{CRBs}$, and $RB_{START}$ is provided. Any formula variation, any table, or any other predefined rule for obtaining a result the same as that obtained according to the example formula is provided. In other words, the first resource indication value is the same as a result calculated according to the formula.

In a possible design of the first aspect or the second aspect, when the uplink bandwidth is 15 resource blocks, and $3 \leq L_{CRBs} \leq 6$, the first resource indication value is equal to $N_{RB}^{UL}(L_{CRBs}-3)+RB_{START}$; and/or when the uplink bandwidth is 15 resource blocks, and $L_{CRBs}=2$, the first resource indication value is equal to $60+RB_{START2}$, where $N_{RB}^{UL}$ indicates the quantity of resource blocks included in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

In the foregoing embodiment of this application, when the uplink bandwidth is greater than 15 RBs, the terminal device separately uses different calculation formulas based on different values of $L_{CRBs}$. For example, $3 \leq L_{CRBs} \leq 6$, and the first resource indication value is equal to $N_{RB}^{UL}(L_{CRBs}-3)+RB_{START}$. $RB_{START}$ is the index of the allocated starting resource block, and $RB_{START2}$ is the value correlated with $RB_{START}$, where the correlation refers to a value correspondence between the two values. To be specific, a value of $RB_{START}$ may be calculated based on $RB_{START2}$. For example, the first resource indication value(s) corresponding to $L_{CRBs}=2$ may be numbered in ascending order based on $60+RB_{START2}$ or $4*N_{RB}^{UL}+RB_{START2}$.

In a possible design of the first aspect or the second aspect, when the uplink bandwidth is 15 resource blocks, and $L_{CRBs}=2$, the first resource indication value is equal to $RB_{START2}$; and/or when the uplink bandwidth is 15 resource blocks, and $3 \leq L_{CRBs} \leq 6$, the first resource indication value is equal to $N_{RB}^{UL}(L_{CRBs}-3)+RB_{START}+4$, where $N_{RB}^{UL}$ indicates the quantity of resource blocks included in the uplink bandwidth, $L_{CRBs}$ is the length of the allocated consecutive resource blocks. $RB_{START}$ is an index of the allocated starting resource block, and $RB_{START2}$ is a value correlated with $RB_{START}$.

In the foregoing embodiment of this application, when the uplink bandwidth is greater than 15 RBs, the terminal device separately uses different calculation formulas based on different values of $L_{CRBs}$. For example, $3 \leq L_{CRBs} \leq 6$, and the first resource indication value is equal to $N_{RB}^{UL}(L_{CRBs}-3)+RB_{START}+4$. $RB_{START}$ is the index of the allocated starting resource block, and $RB_{START}$ is the value correlated with $RB_{START}$, where the correlation refers to a value correspondence between the two values. To be specific, a value of $RB_{START}$ may be calculated based on $RB_{START2}$. For example, the first resource indication value(s) corresponding to $L_{CRBs}=2$ may be numbered in ascending order based on $RB_{START2}$.

In a possible design of the first aspect or the second aspect, $0 \leq RB_{START2} \leq 3$; and when $RB_{START2}$ is equal to 0, $RB_{START}$ is equal to 0; and/or when $RB_{START2}$ is equal to 1, $RB_{START}$ is equal to 6; and/or when $RB_{START2}$ is equal to 2, $RB_{START}$ is equal to 7; and/or when $RB_{START2}$ is equal to 3. $RB_{START}$ is equal to 13.

A relationship between $RB_{START2}$ and the index $RB_{START}$ of the starting resource block allocated by the base station may not be unique. In other words, there may be another mapping relationship between $RB_{START2}$ and $RB_{START}$. For example, when $RB_{START2}$ is equal to 0 $RB_{START}$ is equal to 13; and/or when $RB_{START2}$ is equal to 1, $RB_{START}$ is equal to 7; and/or when $RB_{START2}$ is equal to 2, $RB_{START}$ is equal to 6; and/or when $RB_{START2}$ is equal to 3. $RB_{START}$ is equal to 0.

In a possible design of the first aspect or the second aspect, the terminal device is a low-complexity terminal device and/or a terminal device in a coverage enhancement mode A.

According to a third aspect, an embodiment of this application provides a terminal device, including:

a receiving module, configured to receive downlink control information sent by a network device, where the downlink control information includes a resource allocation field, the resource allocation field includes $$\left\lceil \log_2 \left\lfloor \frac{N_{RB}^{UL}}{6} \right\rfloor \right\rceil + 5 \text{ bits},$$

and $N_{RB}^{UL}$ indicates a quantity of resource blocks included in an uplink bandwidth, where when the resource allocation field indicates, based on a first resource allocation scheme, resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for the terminal device, and a length of consecutive resource blocks allocated in the narrowband is N, where 1≤N≤6; or when the resource allocation field indicates, based on a second resource allocation scheme, resource allocation in the uplink bandwidth, the $$\left\lceil \log_2 \left\lfloor \frac{N_{RB}^{UL}}{6} \right\rfloor \right\rceil + 5 \text{ bits}$$

of the resource allocation field indicate a first resource indication value;

a processing module, configured to: when determining, based on the second resource allocation scheme, resources allocated by the network device, determine the first resource indication value based on the resource allocation field, where the processing module is configured to determine, based on the first resource indication value, a starting resource block allocated in the uplink bandwidth and a length $L_{CRBs}$ of consecutive resource blocks allocated in the uplink bandwidth, where M≤$L_{CRBs}$≤6, and M is a positive integer greater than 1; and a sending module, configured to send data on resources corresponding to the starting resource block and the length of the consecutive resource blocks.

According to a fourth aspect, an embodiment of this application provides a network device, including:

a processing module, configured to determine a resource allocation scheme and a resource allocation field in downlink control information, where the resource allocation field includes $$\left\lceil \log_2 \left\lfloor \frac{N_{RB}^{UL}}{6} \right\rfloor \right\rceil + 5 \text{ bits},$$

and $N_{RB}^{UL}$ indicates a quantity of resource blocks included in an uplink bandwidth, where when resource allocation is determined to be performed in a first resource allocation scheme, the resource allocation field indicates, based on the first resource allocation scheme, resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for the terminal device, and a length of consecutive resource blocks allocated in the narrowband is N, where 1≤N≤6; or when resource allocation is determined to be performed in a second resource allocation scheme, the resource allocation field indicates, based on the second resource allocation scheme, resource allocation in the uplink bandwidth, and the $$\left\lceil \log_2 \left\lfloor \frac{N_{RB}^{UL}}{6} \right\rfloor \right\rceil + 5 \text{ bits}$$

of the resource allocation field indicate a first resource indication value, where the first resource indication value indicates a starting resource block allocated to the terminal device and a length $L_{CRBs}$ of consecutive resource blocks allocated to the terminal device, where M≤$L_{CRBs}$≤6 and M is a positive integer greater than 1;

a sending module, configured to send the downlink control information to the terminal device, and a receiving module, configured to receive, on resources corresponding to the starting resource block and the length of the consecutive resource blocks, data sent by the terminal device.

In a possible design of the third aspect or the fourth aspect, when the uplink bandwidth is six resource blocks, the resource allocation field indicates the resource allocation only in the first resource allocation scheme.

In a possible design of the third aspect or the fourth aspect, when the resource allocation field indicates, based on the second resource allocation scheme, the resource allocation in the uplink bandwidth, when the uplink bandwidth is 15 resource blocks, M=3; and/or when the uplink bandwidth is 25, 50, 75, or 100 resource blocks, M=2.

In a possible design of the third aspect or the fourth aspect, when the resource allocation field indicates, based on the second resource allocation scheme, the resource allocation in the uplink bandwidth, when the uplink bandwidth is 15, 25, 50, 75, or 100 resource blocks, M=2.

In a possible design of the third aspect or the fourth aspect, when the uplink bandwidth is 25, 50, 75, or 100 resource blocks, the first resource indication value is equal to $N_{RB}^{UL}(L_{CRBs}-2)+RB_{START}$, where $N_{RB}^{UL}$ indicates the quantity of resource blocks included in the uplink bandwidth, $L_{CRBs}$ is the length of the allocated consecutive resource blocks, and $RB_{START}$ is an index of the allocated starting resource block.

In a possible design of the third aspect or the fourth aspect, when the uplink bandwidth is 15 resource blocks, and $3 \leq L_{CRBs} \leq 6$, the first resource indication value is equal to $N_{RB}^{UL}(L_{CRBs}-3)+RB_{START}$; and/or when the uplink bandwidth is 15 resource blocks, and $L_{CRBs}=2$, the first resource indication value is equal to $60+RB_{START2}$, where $N_{RB}^{UL}$ indicates the quantity of resource blocks included in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

In a possible design of the third aspect or the fourth aspect, when the uplink bandwidth is 15 resource blocks, and $L_{CRBs}=2$, the first resource indication value is equal to $RB_{START2}$; and/or when the uplink bandwidth is 15 resource blocks, and $3 \leq L_{CRBs} \leq 6$, the first resource indication value is equal to $N_{RB}^{UL}(L_{CRBs}-3)+RB_{START}+4$, where $N_{RB}^{UL}$ indicates the quantity of resource blocks included in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

In a possible design of the third aspect or the fourth aspect, $0 \leq RB_{START2} \leq 3$; and when $RB_{START2}$ is equal to 0, $RB_{START}$ is equal to 0; and/or
when $RB_{START2}$ is equal to 1, $RB_{START}$ is equal to 6; and/or
when $RB_{START2}$ is equal to 2, $RB_{START}$ is equal to 7; and/or
when $RB_{START2}$ is equal to 3, $RB_{START}$ is equal to 13.

In a possible design of the third aspect or the fourth aspect, the terminal device is a low-complexity terminal device and/or a terminal device in a coverage enhancement mode A.

In the third aspect of this application, the composition modules of the terminal device may further perform the steps described in the first aspect and the possible implementations. For details, refer to the descriptions in the first aspect and the possible implementations.

In the fourth aspect of this application, the composition modules of the network device may further perform the steps described in the second aspect and the possible implementations. For details, refer to the descriptions in the second aspect and the possible implementations.

According to a fifth aspect, an embodiment of this application provides a computer-readable storage medium. The computer-readable storage medium stores an instruction, and when the instruction is run on a computer, the computer is enabled to perform the method according to the first aspect or the second aspect.

According to a sixth aspect, an embodiment of this application provides a computer program product including an instruction. When the computer program product runs on a computer, the computer is enabled to perform the method according to the first aspect or the second aspect.

According to a seventh aspect, an embodiment of this application provides a communications apparatus. The communications apparatus may include an entity such as a terminal device or a network device. The communications apparatus includes a processor and a memory. The memory is configured to store an instruction. The processor is configured to execute the instruction in the memory, so that the communications apparatus performs the method according to either the first aspect or the second aspect.

According to an eighth aspect, this application provides a chip system. The chip system includes a processor and is configured to support a terminal device or a network device in implementing functions in the foregoing aspects, for example, sending or processing data and/or information in the foregoing methods. In a possible design, the chip system further includes a memory. The memory is configured to store a program instruction and data that are necessary for the terminal device or the network device. The chip system may include a chip, or may include a chip and another discrete component.

DESCRIPTION OF EMBODIMENTS

Figure 1:
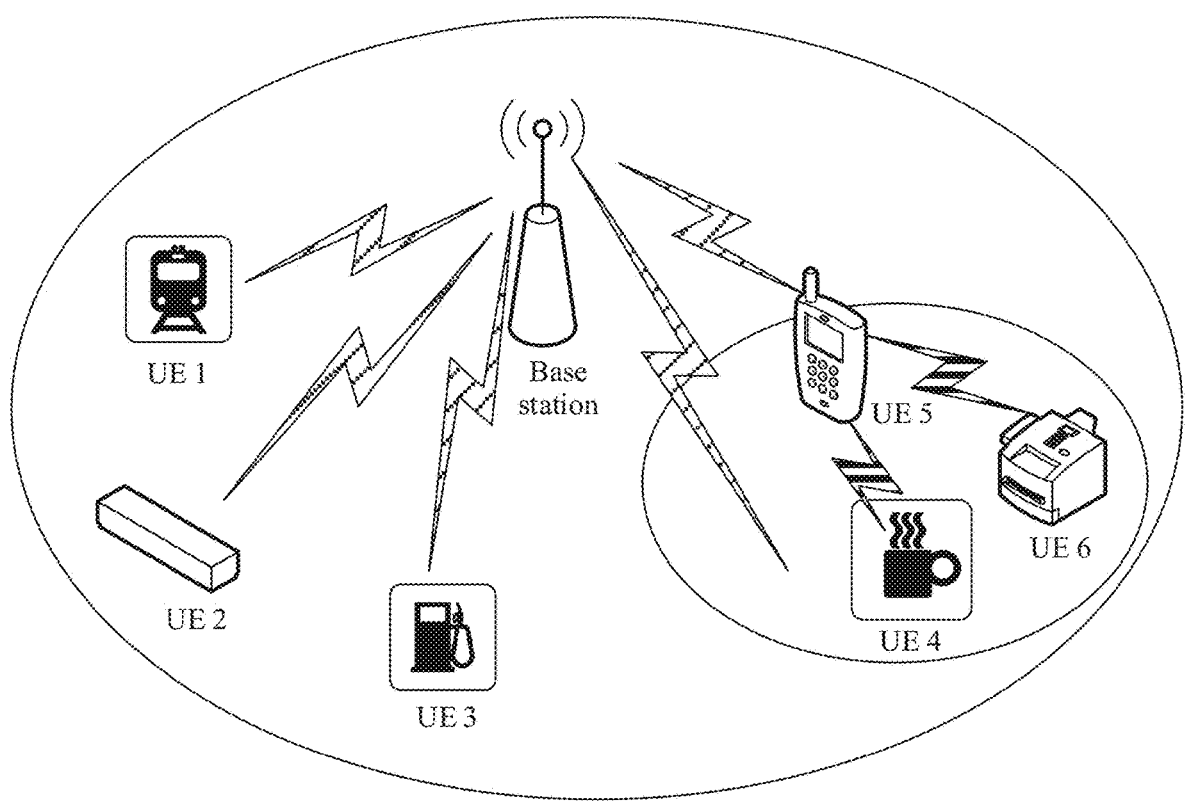
FIG. 1 is a schematic diagram of a system architecture to which a resource allocation method in a TDD system is applied according to an embodiment of this application.

Embodiments of this application provide a resource allocation method and a device in a TDD system, to implement resource allocation in the TDD system, and improve flexibility of resource allocation and resource utilization.

The following describes the embodiments of this application with reference to the accompanying drawings.

In the specification, the claims, and the accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have" and any other variants mean to cover a non-exclusive inclusion, so that a process, a method, a system, a product, or a device that includes a series of units is not necessarily limited to those units, but may include other units not expressly listed or inherent to such a process, method, product, or device.

The technical solutions in the embodiments of this application may be used in various communications systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency-division multiple access, OFDMA) system, a single carrier frequency division multiple access (single carrier FDMA, SC-FDMA) system, and another system. The terms "system" and "network" can be interchanged with each other. The CDMA system may implement radio technologies such as universal terrestrial radio access (universal terrestrial radio access, UTRA) and CDMA2000. UTRA may include a wideband CDMA (wideband CDMA, WCDMA) technology and another variant technology of CDMA. CDMA2000 may cover interim standard (interim standard, IS) 2000 (IS-2000), the IS-95 standard, and the IS-856 standard. The TDMA system may implement radio technologies such as global system for mobile communications (global system for mobile communication, GSM). The OFDMA system may implement radio technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. UTRA corresponds to a UMTS, and E-UTRA corresponds to an evolved version of the UMTS. A new version of the UMTS, namely. E-UTRA, is used in 3GPP long term evolution (long term evolution, LTE) and various versions evolved based on LTE. A 5th generation (5 Generation. "5G" for short) communications system and new radio (New Radio, "NR" for short) are next generation communications systems under study. In addition, the communications system may be further applicable to a future-oriented communications technology, and is applicable to all of the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of a network architecture and emergence of new service scenarios, the technical solutions provided in the embodiments of this application can also be used for similar technical problems.

FIG. 1 is a schematic structural diagram of a possible radio access network (radio access network, RAN for short) according to an embodiment of this application. The RAN may be a base station access system in a 2G network (to be specific, the RAN includes a base station and a base station controller), a base station access system in a 3G network (to be specific, the RAN includes a base station and an RNC), a base station access system in a 4G network (to be specific, the RAN includes an eNB and an RNC), or a base station access system in a 5G network.

The RAN includes one or more network devices. The network device may be any device having a wireless transceiver function, or a chip disposed in a device having a wireless transceiver function. The network device includes but is not limited to a base station (for example, a base station BS, a NodeB, an evolved NodeB (eNodeB or eNB), a gNodeB or gNB in a fifth generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. The RAN may support a network using the foregoing one or more technologies, or a future evolved network. The base station may include one or more co-site or non-co-site transmission reception points (Transmission receiving point, TRP). The network device may alternatively be a radio controller, a centralized unit (centralized unit, CU), or a distributed unit (distributed unit, DU) in a cloud radio access network (cloud radio access network, CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting the 5G network, or may support a dual connection to a base station in an LTE network and a base station in the 5G network. For example, the terminal is connected to a radio access network (radio access network, RAN) node of a wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (base band unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including a CU node and a DU node.

The terminal devices 1 to 6 each are also referred to as user equipment (user equipment, UE), a mobile station (mobile station, MS), a mobile terminal (mobile terminal, MT), a terminal, or the like, and is a device that provides voice and/or data connectivity for a user, or is a chip disposed in the device, for example, a handheld device or a vehicle-mounted device having a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home). The terminal device provided in the embodiments of this application may be a low-complexity terminal device and/or a terminal device in a coverage enhancement mode A.

In the embodiments of this application, the base station and the UE 1 to the UE 6 form a communications system. In the communications system, the base station sends one or more of system information, a RAR message, and a paging message to one or more of the UE 1 to the UE 6. In addition, the UE 4 to the UE 6 also form a communications system. In the communications system, the UE 5 may function as a base station, and the UE 5 may send one or more of system information, control information, and a paging message to one or both of the UE 4 and the UE 6.

In the conventional technology, when a base station allocates resources to UE based on a resource allocation scheme of downlink control information (Downlink Control Information, DCI) format 6-0A, the base station needs to first indicate a narrowband in an uplink bandwidth, and then indicates a starting resource block and a length in the narrowband. In this way, flexibility of resource allocation is greatly limited. For example, a system bandwidth includes 100 resource blocks, and the 100 resource blocks may include 16 narrowbands, where each narrowband includes six non-overlapping and consecutive resource blocks. When the base station allocates six resource blocks to low-complexity UE, the base station indicates that six resource blocks in a narrowband are allocated to the UE. Because there are 16 narrowbands in total, there are a maximum of 16 allocation combinations. However, for the system bandwidth with 100 resource blocks, a resource whose length is equal to six resource blocks may be allocated from any resource block in the system bandwidth. In this case, there are 95 allocation combinations in total. Therefore, the resource allocation scheme of DCI format 6-0A in the conventional technology lacks flexibility.

Figure 2:
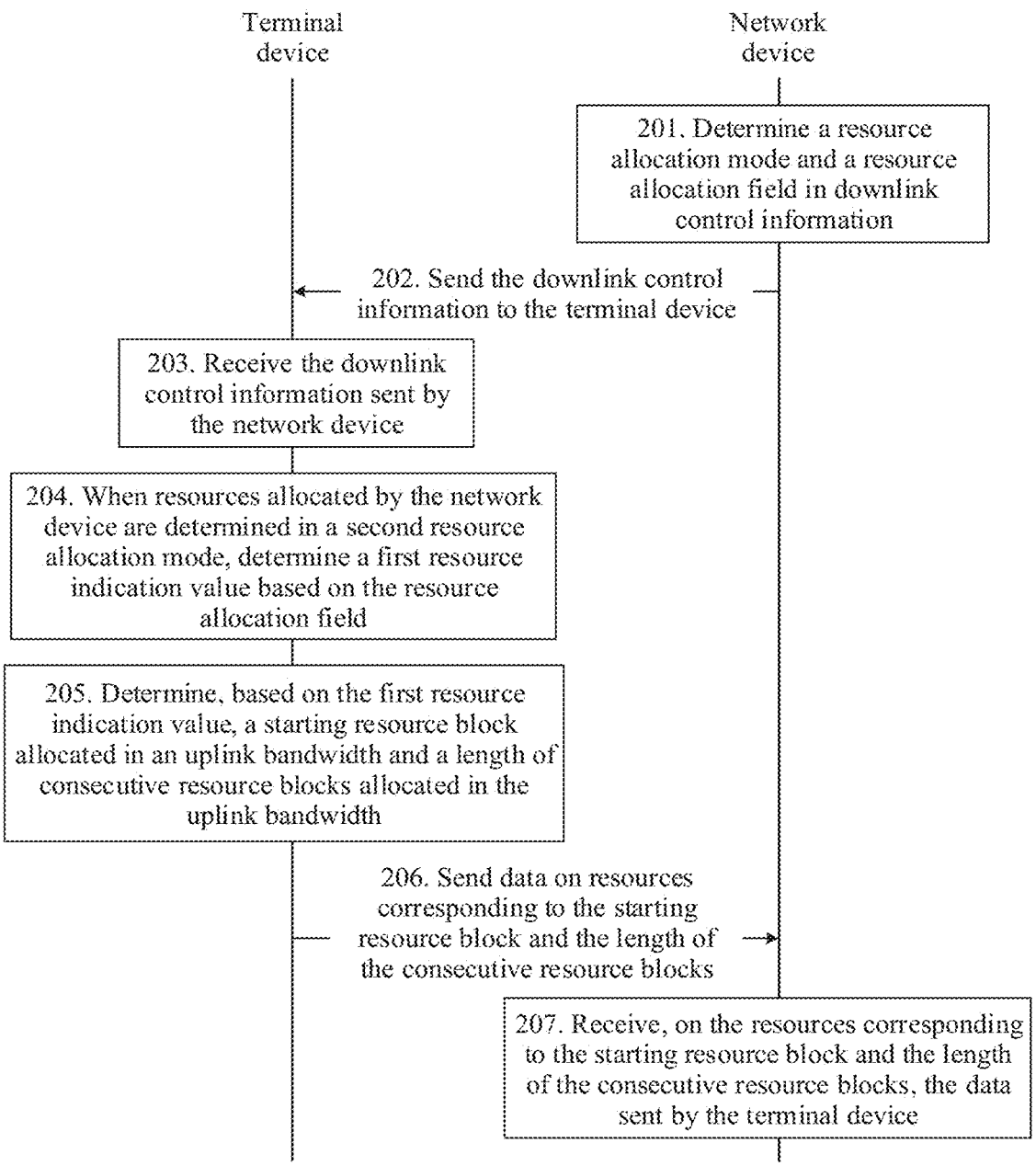
FIG. 2 is a schematic block diagram of an interaction procedure of a resource allocation method in a TDD system according to an embodiment of this application.

The embodiments of this application provide a resource allocation method in a TDD system. For the TDD system, when a resource allocation field is $$\left\lceil \log_2 \left\lfloor \frac{N_{RB}^{UL}}{6} \right\rfloor \right\rceil + 5 \text{ bits,}$$

flexibility of resource allocation is improved. FIG. 2 is a schematic diagram of an interaction procedure of a network device and a terminal device according to an embodiment of this application. The resource allocation method in a TDD system that is provided in the embodiments of this application mainly includes the following steps.

201. The network device determines a resource allocation scheme and a resource allocation field in downlink control information.

The resource allocation field includes $$\left\lceil \log_2 \left\lfloor \frac{N_{RB}^{UL}}{6} \right\rfloor \right\rceil + 5 \text{ bits,}$$

and $N_{RB}^{UL}$ indicates a quantity of resource blocks included in an uplink bandwidth.

When the network device determines to perform resource allocation in a first resource allocation scheme, the resource allocation field indicates, based on the first resource allocation scheme, resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in the narrowband for the terminal device, and a length of consecutive resource blocks allocated in the narrowband is N, where 1≤N≤6.

When the network device determines to perform resource allocation in a second resource allocation scheme, the resource allocation field indicates, based on the second resource allocation scheme, resource allocation in the uplink bandwidth, and the $$\left\lceil \log_2 \left\lfloor \frac{N_{RB}^{UL}}{6} \right\rfloor \right\rceil + 5 \text{ bits}$$

of the resource allocation field indicate a first resource indication value, where the first resource indication value indicates a starting resource block allocated to the terminal device and a length $L_{CRBs}$ of consecutive resource blocks allocated to the terminal device, where $M \leq L_{CRBs} \leq 6$, and M is a positive integer greater than 1.

In some embodiments of this application, the network device first determines a plurality of resource allocation schemes, and the network device further needs to determine the resource allocation field in the downlink control information. The resource allocation schemes determined by the network device may include the first resource allocation scheme and the second resource allocation scheme. Resources that can be allocated by the network device in different resource allocation schemes are different. The resource allocation field determined by the network device includes the $$\left\lceil \log_2 \left\lfloor \frac{N_{RB}^{UL}}{6} \right\rfloor \right\rceil + 5 \text{ bits.}$$

For example, the resource allocation field determined by the network device includes only the $$\left\lceil \log_2 \left\lfloor \frac{N_{RB}^{UL}}{6} \right\rfloor \right\rceil + 5 \text{ bits.}$$

The resource block may be a physical resource block (Physical Resource Block) or a virtual resource block (Virtual Resource Block). For example, $N_{RB}^{UL}$ indicates a quantity of uplink physical resource blocks included in a system bandwidth, $\lfloor \ \rfloor$ indicates a rounding down operation, and $\lceil \ \rceil$ indicates a rounding up operation.

Figure 3:
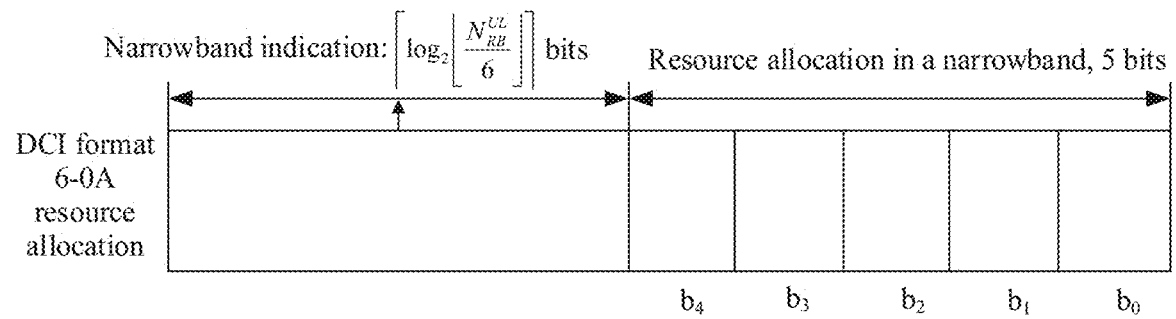
FIG. 3 is a schematic diagram of resources allocated in a first resource allocation scheme according to an embodiment of this application.
Figure 4:
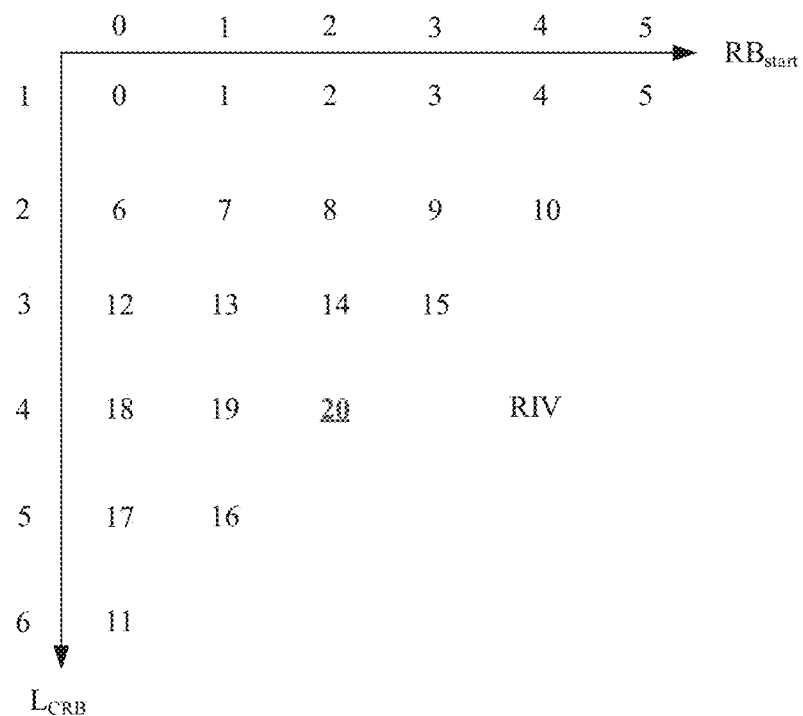
FIG. 4 is a schematic diagram of resource allocation corresponding to a resource indication value in a first resource allocation scheme according to an embodiment of this application.

In this embodiment of this application, in the first resource allocation scheme used by the network device, the resource allocation field first indicates, based on the first resource allocation scheme, the narrowband in the uplink bandwidth, and then indicates the starting resource block and the length in the narrowband. That is, the resource allocation is performed in the narrowband. The $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate the narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate the resource allocation in the narrowband for the terminal device, and the length of the consecutive resource blocks allocated in the narrowband is N, where $1 \leq N \leq 6$. For example, based on a resource allocation scheme of DCI format 6-0A, the $$\left\lceil \log_2 \left\lfloor \frac{N_{RB}^{UL}}{6} \right\rfloor \right\rceil \text{ bits}$$

are used to indicate an allocated narrowband (where one narrowband includes six resource blocks), and 5 least significant bits in the resource block allocation field are used to indicate resources allocated based on an uplink resource allocation type 0 in the indicated narrowband. For example, FIG. 3 is a schematic diagram of resources allocated in the first resource allocation scheme according to an embodiment of this application. In FIG. 3, 5 least significant bits indicate a resource allocation index value, and each index value correspondingly indicates a starting resource block allocated by a base station and a length of consecutive resource blocks allocated by the base station. FIG. 4 is a schematic diagram of resource allocation corresponding to a resource indication value (Resource Indication Value, RIV) in the first resource allocation scheme according to an embodiment of this application. In FIG. 4, only resource allocation index values 0 to 20 are used.

In this embodiment of this application, the network device may further perform the resource allocation in the second resource allocation scheme. The resource allocation field indicates, based on the second resource allocation scheme, the resource allocation in the uplink bandwidth. To be specific, the resource allocation is performed in the entire uplink bandwidth (that is, in a full bandwidth). The $$\left\lceil \log_2 \left\lfloor \frac{N_{RB}^{UL}}{6} \right\rfloor \right\rceil + 5 \text{ bits}$$

of the resource allocation field are used to indicate the first resource indication value. The first resource indication value indicates the starting resource block allocated to the terminal device and the length $L_{CRBs}$ of the consecutive resource blocks allocated to the terminal device, where $M \leq L_{CRBs} \leq 6$, and M is a positive integer greater than 1. For example, a value of M may be 2, 3, 4, 5, or 6. During MTC resource allocation, the $$\left\lceil \log_2 \left\lfloor \frac{N_{RB}^{UL}}{6} \right\rfloor \right\rceil + 5 \text{ bits}$$

of the resource allocation field configured by the network device in this embodiment of this application indicate the first resource indication value, so that a flexible starting PRB can be indicated. In other words, the starting RB allocated to an MTC user may be any RB in the system bandwidth, and the length of the allocated consecutive RBs may be any one of 2 RBs to 6 RBs.

202. The network device sends the downlink control information to the terminal device.

After the network device determines the downlink control information, the network device may send the downlink control information to the terminal device. The downlink control information includes the resource allocation field, and the resource allocation field indicates the resources allocated to the terminal device in the first resource allocation scheme or the second resource allocation scheme.

203. The terminal device receives the downlink control information sent by the network device, where the downlink control information includes the resource allocation field, the resource allocation field includes the $$\left\lceil \log_2 \left\lfloor \frac{N_{RB}^{UL}}{6} \right\rfloor \right\rceil + 5 \text{ bits},$$

and $N_{RB}^{UL}$ indicates the quantity of resource blocks included in the uplink bandwidth.

When the resource allocation field indicates, based on the first resource allocation scheme, the resource allocation in the uplink bandwidth, the $$\left\lceil \log_2 \left\lfloor \frac{N_{RB}^{UL}}{6} \right\rfloor \right\rceil \text{ bits}$$

in the $$\left\lceil \log_2 \left\lfloor \frac{N_{RB}^{UL}}{6} \right\rfloor \right\rceil + 5 \text{ bits}$$

of the resource allocation field indicate the narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate the resource allocation in the narrowband for the terminal device, and the length of the consecutive resource blocks allocated in the narrowband is N, where $1 \leq N \leq 6$.

When the resource allocation field indicates, based on the second resource allocation scheme, the resource allocation in the uplink bandwidth, the $$\left\lceil \log_2 \left\lfloor \frac{N_{RB}^{UL}}{6} \right\rfloor \right\rceil + 5 \text{ bits}$$

of the resource allocation field indicate the first resource indication value.

In some embodiments of this application, when the uplink bandwidth is six resource blocks, the resource allocation field indicates the resource allocation only in the first resource allocation scheme.

Specifically, when the uplink bandwidth has only six RBs, the uplink bandwidth is 1.4 MHz. In this case, the uplink bandwidth includes only one narrowband. Therefore, for resource allocation in the uplink bandwidth of 1.4 MHz, the resource allocation field only needs to indicate the resource allocation in the first resource allocation scheme, so that a flexible starting PRB can be indicated. In other words, when the uplink bandwidth is six resource blocks, the second resource allocation scheme provided in the embodiments of this application may not be used. For example, the resource allocation may be performed based on a resource allocation scheme of Rel-13 DCI format 6-0A.

204. When determining, based on the second resource allocation scheme, the resources allocated by the network device, the terminal device determines the first resource indication value based on the resource allocation field.

In this embodiment of this application, the terminal device determines that the resource allocation scheme is the second resource allocation scheme, and when determining, based on the second resource allocation scheme, the resources allocated by the network device, the terminal device may determine, based on the resource allocation field, that the resource indication value indicated by the network device is the first resource indication value.

205. The terminal device determines, based on the first resource indication value, the starting resource block allocated in the uplink bandwidth and the length $L_{CRBs}$ of the consecutive resource blocks allocated in the uplink bandwidth, where $M \leq L_{CRBs} \leq 6$, and M is a positive integer greater than 1.

In this embodiment of this application, the terminal device determines that the $$\left\lceil \log_2 \left\lfloor \frac{N_{RB}^{UL}}{6} \right\rfloor \right\rceil + 5 \text{ bits}$$

are used to indicate the first resource indication value. The terminal device determines, based on the first resource indication value, the starting resource block allocated by the network device and the length $L_{CRBs}$ of the consecutive resource blocks allocated by the network device, where $M \leq L_{CRBs} \leq 6$, and M is a positive integer greater than 1. For example, a value of the length of the consecutive resource blocks may be 2, 3, 4, 5, or 6. During MTC resource allocation, the $$\left\lceil \log_2 \left\lfloor \frac{N_{RB}^{UL}}{6} \right\rfloor \right\rceil + 5 \text{ bits}$$

of the resource allocation field configured by the network device in this embodiment of this application indicate the first resource indication value, so that a flexible starting PRB can be indicated. In other words, the starting RB allocated to an MTC user may be any RB in the system bandwidth, and the length of the allocated consecutive RBs may be any one of 2 RBs to 6 RBs.

Figure 5:
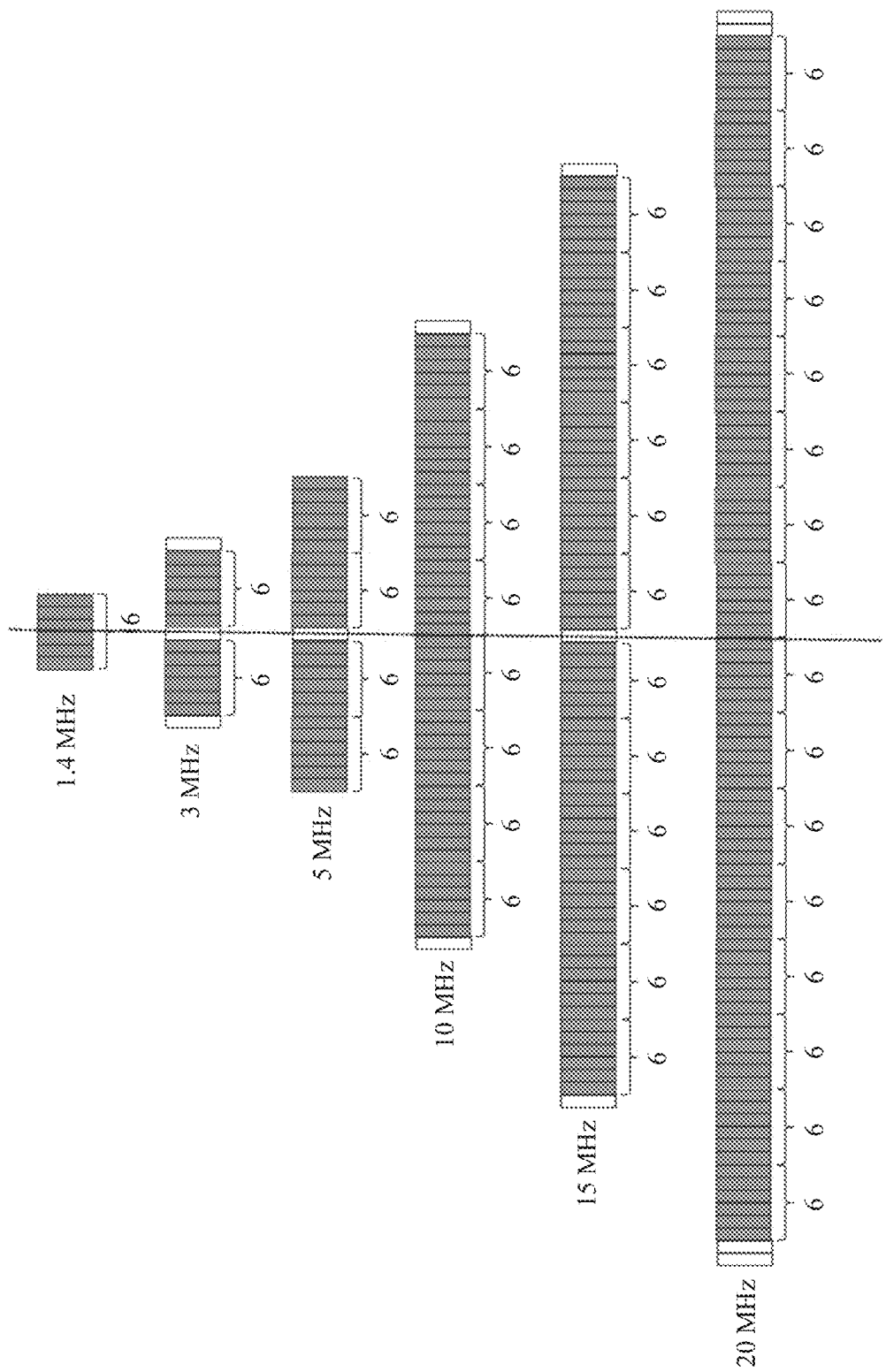
FIG. 5 is a schematic diagram of resource blocks included in an uplink bandwidth according to an embodiment of this application.

FIG. 5 is a schematic diagram of resource blocks included in an uplink bandwidth according to an embodiment of this application. The uplink bandwidth may be 6 RBs, 15 RBs, 25 RBs, 50 RBs, 75 RBs, or 100 RBs (corresponding to 1.4 MHz, 3 MHz, 5 MHz, 10 MHz, 15 MHz, or 20 MHz, respectively). FIG. 5 shows a quantity of narrowbands and a total quantity of resource blocks that are included in each type of uplink bandwidth. The following Table 1 shows a quantity of narrowbands and a total quantity of resource blocks that are included in each type of uplink bandwidth.

TABLE 1

| Bandwidth | 1.4 MHz | 3 MHz | 5 MHz | 10 MHz | 15 MHz | 20 MHz |
|---|---|---|---|---|---|---|
| Quantity of RBs included in an uplink bandwidth | 6 RBs | 15 RBs | 25 RBs | 50 RBs | 75 RBs | 100 RBs |
| Quantity of narrowbands included in the uplink bandwidth | 1 | 7 | 4 | 8 | 12 | 16 |

For a system with a bandwidth of 1.4 MHz, because there is only one narrowband, a flexible starting RB can be indicated through resource allocation based on the resource allocation scheme of DCI format 6-0A. Therefore, for a system with a system bandwidth of 6 RBs, flexible resource allocation may be performed based on the resource allocation scheme of DCI format 6-0A.

When the system bandwidth is greater than 1.4 MHz, a size of the resource block allocation field is the $$\left\lceil \log_2\left\lfloor \frac{N_{RB}^{UL}}{6} \right\rfloor \right\rceil + 5 \text{ bits.}$$

In different bandwidths, a total quantity of states that can be represented by using the bits is $2^n$, that is, 2 raised to the power of n, where $$n = \left\lceil \log_2\left\lfloor \frac{N_{RB}^{UL}}{6} \right\rfloor \right\rceil + 5,$$

and n is a quantity of bits of the resource block allocation field.

In some embodiments of this application, when the resource allocation field indicates, based on the second resource allocation scheme, the resource allocation in the uplink bandwidth, when the uplink bandwidth is 15 resource blocks, M=3; and/or when the uplink bandwidth is 25, 50, 75, or 100 resource blocks, M=2.

When the uplink bandwidth is 15 resource blocks, the terminal device determines the length $L_{CRBs}$, of the consecutive resource blocks indicated by the network device, where $3 \leq L_{CRBs} \leq 6$. For example, a value of the length of the consecutive resource blocks may be 3, 4, 5, or 6. When the uplink bandwidth is 25, 50, 75, or 100 resource blocks, the terminal device determines the length $L_{CRBs}$, of the consecutive resource blocks indicated by the network device, where $M \leq L_{CRBs} \leq 6$, and M=2. For example, a value of the length of the consecutive resource blocks may be 2, 3, 4, 5, or 6.

When the uplink bandwidth is 15 RBs, a value of $L_{CRBs}=3$ to 6 may be indicated by using an RIV value, and there is a total of 4*15=60 states. However, there are a total of 8 bits of the resource block allocation field that can indicate $2^8=64$ states. Therefore, a flexible starting PRB can be indicated.

In some embodiments of this application, when the resource allocation field indicates, based on the second resource allocation scheme, the resource allocation in the uplink bandwidth, when the uplink bandwidth is 15, 25, 50, 75, or 100 resource blocks, M=2.

When the uplink bandwidth is 15, 25, 50, 75, or 100 resource blocks, the terminal device determines the length $L_{CRBs}$, of the consecutive resource blocks indicated by the network device, where $2 \leq L_{CRBs} \leq 6$. For example, a value of the length of the consecutive resource blocks may be 2, 3, 4, 5, or 6. When the uplink bandwidth is 15 RBs, a value of $L_{CRBs}=3$ to 6 may be indicated by using an RIV value, and there is a total of 4*15=60 states. However, there are a total of 8 bits of the resource block allocation field that can indicate $2^8=64$ states, where the four more states can exactly indicate four states that cannot be indicated based on the resource allocation scheme of Rel-13 DCI format 6-A when $L_{CRBs}=2$. In this way, changes to an RIV formula can be minimized, complexity of determining the RIV value by a base station can be reduced, complexity of determining a starting resource block and a length for resource allocation by a user based on the RIV value can be reduced, and flexibility of resource allocation can be improved.

In some embodiments of this application, when the uplink bandwidth is 25, 50, 75, or 100 resource blocks, the first resource indication value is equal to $N_{RB}^{UL}(L_{CRBs}-2)+RB_{START}$.

$N_{RB}^{UL}$ indicates the quantity of resource blocks included in the uplink bandwidth, $L_{CRBs}$ is the length of the allocated consecutive resource blocks, and $RB_{START}$ is an index of the allocated starting resource block.

When the uplink bandwidth is greater than 15 RBs, the first resource indication value is equal to $N_{RB}^{UL}(L_{CRBs}-2)+RB_{START}$. Therefore, $L_{CRBs}$ and $RB_{START}$ may be calculated based on the first resource indication value.

It should be noted that, herein, that the first resource indication value is equal to $N_{RB}^{UL}(L_{CRBs}-2)+RB_{START}$ is merely an example. A relationship between the first resource indication value and the three parameters: $N_{RB}^{UL}$, $L_{CRBs}$, and $RB_{START}$ is provided. Any formula variation, any table, or any other predefined rule for obtaining a result the same as that obtained according to the example formula falls in the protection scope of the embodiments of this application. In other words, the first resource indication value is the same as a result calculated according to the formula.

In the foregoing embodiment, a PRB length determined by the terminal device is floor(RIV/NRB)+2, where RIV indicates the first resource indication value, and floor(x) means rounding x down, that is, rounding x down to an integer less than or equal to x. The starting RB is mod(RIV, NRB), where mod(x, y) indicates a remainder obtained by dividing x by y.

In some embodiments of this application, when the uplink bandwidth is 15 resource blocks, and $3 \leq L_{CRBs} \leq 6$, the first resource indication value is equal to $N_{RB}^{UL}(L_{CRBs}-3)+RB_{START}$; and/or when the uplink bandwidth is 15 resource blocks, and $L_{CRBs}=2$, the first resource indication value is equal to $60+RB_{START2}$, where $N_{RB}^{UL}$ indicates the quantity of resource blocks included in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

In the foregoing embodiment of this application, when the uplink bandwidth is greater than 15 RBs, the terminal device separately uses different calculation formulas based on different values of $L_{CRBs}$. For example, $3 \leq L_{CRBs} \leq 6$, and the first resource indication value is equal to $N_{RB}^{UL}(L_{CRBs}-3)+RB_{START}$. $RB_{START}$ is the index of the allocated starting resource block, and $RB_{START}$ is the value correlated with $RB_{START}$, where the correlation refers to a value correspondence between the two values. To be specific, a value of $RB_{START}$ may be calculated based on $RB_{START2}$. For example, the first resource indication value(s) corresponding to $L_{CRBs}=2$ may be numbered in ascending order based on $60+RB_{START2}$ or $4*N_{RB}^{UL}+RB_{START2}$.

It should be noted that, herein, that the first resource indication value is equal to $(L_{CRBs}-3)+RB_{START}$ is merely an example. A relationship between the first resource indication value and the three parameters: $N_{RB}^{UL}$, $L_{CRBs}$, and $RB_{START}$ is provided. Any formula variation, any table, or any other predefined rule for obtaining a result the same as that obtained according to the example formula falls in the protection scope of the embodiments of this application. In other words, the first resource indication value is the same as a result calculated according to the formula.

In some embodiments of this application, when the uplink bandwidth is 15 resource blocks, and $L_{CRBs}=2$, the first resource indication value is equal to $RB_{START2}$; and/or when the uplink bandwidth is 15 resource blocks, and $3 \leq L_{CRBs} \leq 6$, the first resource indication value is equal to $N_{RB}^{UL}(L_{CRBs}-3)+RB_{START}+4$, where $N_{RB}^{UL}$ indicates the quantity of resource blocks included in the uplink bandwidth, $L_{CRBs}$ is the length of the allocated consecutive resource blocks. $RB_{START}$ is an index of the allocated starting resource block, and $RB_{START2}$ is a value correlated with $RB_{START}$.

In the foregoing embodiment of this application, when the uplink bandwidth is greater than 15 RBs, the terminal device separately uses different calculation formulas based on different values of $L_{CRBs}$. For example, $3 \leq L_{CRBs} \leq 6$, and the first resource indication value is equal to $N_{RB}^{UL}(L_{CRBs}-3)+RB_{START}+4$. $RB_{START}$ is the index of the allocated starting resource block, and $RB_{START2}$ is the value correlated with $RB_{START}$, where the correlation refers to a value correspondence between the two values. To be specific, a value of $RB_{START}$ may be calculated based on $RB_{START2}$. For example, the first resource indication value(s) corresponding to $L_{CRBs}=2$ may be numbered in ascending order based on $RB_{START2}$.

It should be noted that, herein, that the first resource indication value is equal to $N_{RB}^{UL}(L_{CRBs}-3)+RB_{START}+4$ is merely an example. A relationship between the first resource indication value and the three parameters: $N_{RB}^{UL}$, $L_{CRBs}$, and $RB_{START}$ is provided. Any formula variation, any table, or any other predefined rule for obtaining a result the same as that obtained according to the example formula falls in the protection scope of the embodiments of this application. In other words, the first resource indication value is the same as a result calculated according to the formula.

Further, in some embodiments of this application, $RB_{START2}$ is the value correlated with $RB_{START}$, where the correlation refers to a value correspondence between the two values. To be specific, a value of $RB_{START}$ may be calculated based on $RB_{START2}$, $RB_{START2}$ is an integer, and a value of $RB_{START2}$ is 0, 1, 2, or 3. For example, $0 \leq RB_{START2} \leq 3$; and when $RB_{START2}$ is equal to 0, $RB_{START}$ is equal to 0; and/or
when $RB_{START2}$ is equal to 1, $RB_{START}$ is equal to 6; and/or
when $RB_{START2}$ is equal to 2, $RB_{START}$ is equal to 7; and/or
when $RB_{START2}$ is equal to 3, $RB_{START}$ is equal to 13.

$RB_{START2}$ is a corresponding first starting value when $L_{CRBs}=2$, and one of correspondences between the first starting value and the index $RB_{START}$ ($RB_{START}=0, 6, 7, 13$) of the starting resource block allocated by the base station may be shown in the following Table 2.

TABLE 2

| $RB_{START2}$ | $RB_{START}$ |
|---|---|
| 0 | 0 |
| 1 | 6 |
| 2 | 7 |
| 3 | 13 |

It should be noted that a relationship between $RB_{START2}$ and the index $RB_{START}$ of the starting resource block allocated by the base station may not be unique. In other words, there may be another mapping relationship between $RB_{START2}$ and $RB_{START}$. For example, when $RB_{START2}$ is equal to 0. $RB_{START}$ is equal to 13; and/or when $RB_{START2}$ is equal to 1, $RB_{START}$ is equal to 7; and/or when $RB_{START2}$ is equal to 2. $RB_{START}$ is equal to 6; and/or when $RB_{START2}$ is equal to 3. $RB_{START}$ is equal to 0.

206. The terminal device sends data on resources corresponding to the starting resource block and the length of the consecutive resource blocks.

In this embodiment of this application, the terminal device may determine, by using the resource allocation field, the resources allocated by the network device in the first resource allocation scheme or the second resource allocation scheme, and determine the first resource indication value by using the $$\left\lceil \log_2\left\lfloor \frac{N_{RB}^{UL}}{6} \right\rfloor \right\rceil + 5 \text{ bits}$$

included in the resource allocation field, where the first resource indication value may be used to determine the starting resource block allocated in the uplink bandwidth and the length LCs of the consecutive resource blocks allocated in the uplink bandwidth; and the terminal device may send uplink data on the resources allocated by the network device.

207. The network device receives, on the resources corresponding to the starting resource block allocated to the terminal device and the length of the consecutive resource blocks allocated to the terminal device, the data sent by the terminal device.

In this embodiment of this application, the network device detects, on the resources allocated to the terminal device, the data sent by the terminal device. The terminal device may send the data by using the resources allocated by the network device. Therefore, the network device may receive the data on the resources corresponding to the starting resource block and the length of the consecutive resource blocks, so that data transmission between the network device and the terminal device is implemented.

It can be learned from the example description of this application in the foregoing embodiment that in the first resource allocation scheme, the narrowband is first indicated in the uplink bandwidth, and then the starting resource block and the length are indicated in the narrowband. In the second resource allocation scheme, the starting resource block and the length are indicated in the uplink bandwidth. Therefore, compared with the first resource allocation scheme, the second resource allocation scheme is more flexible, so that effective resources can be allocated to more UEs, and spectral efficiency is improved.

To better understand and implement the foregoing solutions in the embodiments of this application, the following uses a corresponding application scenario as an example for specific description.

According to the resource indication method provided in this embodiment of this application, for the TDD system, flexibility of resource allocation is improved when a quantity of bits is the $$\left\lceil \log_2 \left\lfloor \frac{N_{RB}^{UL}}{6} \right\rfloor \right\rceil + 5 \text{ bits.}$$

For an FDD system, an embodiment of this application further provides a manner in which the base station determines the size of the resource allocation field, determines the resource indication value by using the field, and indicates the resource indication value to the terminal device. For the UE, after receiving the resource block allocation field, the UE may determine the resource indication value based on the received resource block allocation field, and can easily determine, based on the resource indication value, the quantity of resource blocks allocated by the base station and the index of the starting resource block allocated by the base station. In addition, the manner of resource allocation is similar to that of an uplink resource allocation type 0.

When the uplink bandwidth is 6 RBs, 15 RBs, 25 RBs, 50 RBs, 75 RBs, or 100 RBs (corresponding to 1.4 MHz, 3 MHz, 5 MHz, 10 MHz, 15 MHz, or 20 MHz, respectively), a quantity of narrowbands and a total quantity of resource blocks that are included in each type of uplink bandwidth may be determined. An uplink bandwidth of six RBs includes only one narrowband. Therefore, resource allocation in an uplink bandwidth of 1.4 MHz can be performed based on the resource allocation scheme of Rel-13 DCI format 6-0A.

For a system with a bandwidth of 1.4 MHz, because there is only one narrowband, a flexible RB can be indicated through resource allocation based on the resource allocation scheme of Rel-13 DC format 6-0A. Therefore, for a system with a system bandwidth of 6 RBs, flexible resource allocation may be performed based on the resource allocation scheme of Rel-13 DCI format 6-0A.

When the system bandwidth is greater than 1.4 MHz, a size of the resource block allocation field is the $$\left\lceil \log_2 \left\lfloor \frac{N_{RB}^{UL}}{6} \right\rfloor \right\rceil + 5 \text{ bits.}$$

The following Table 3 shows a total quantity of states that can be represented by using the bits in different bandwidths. A calculation method is as follows: If the quantity of bits of the resource block allocation field is n, the total quantity of states that can be represented is $2^n$ that is, 2 raised to the power of n.

TABLE 3

| System bandwidth | Total quantity of PRBs | Quantity of narrow-bands | Quantity of bits of a resource block allocation field | Quantity of states that can be represented |
|---|---|---|---|---|
| 3 MHz | 15 | 2 | 6 | 64 |
| 5 MHz | 25 | 4 | 7 | 128 |
| 10 MHz | 50 | 8 | 8 | 256 |
| 15 MHz | 75 | 12 | 9 | 512 |
| 20 MHz | 100 | 16 | 9 | 512 |

When the system bandwidth is greater than 1.4 MHz (6 RBs), the following Table 4 shows quantities of states required in a flexible resource allocation indication method in an uplink bandwidth in cases of different bandwidths and different lengths L of allocated consecutive RBs. A calculation method is as follows: When the length of the allocated consecutive RBs is L (where a value range is 1 to 6), a possible starting RB position is: 0, 1, . . . , or $N_{RB}^{UL}$-L, where $N_{RB}^{UL}$ is the system bandwidth (represented by the length of the RBs, and a value range is 15, 25, 50, 75, or 100).

TABLE 4

| System bandwidth | Total quantity of PRBs | L = 1 | L = 2 | L = 3 | L = 4 | L = 5 | L = 6 | Total quantity of states |
|---|---|---|---|---|---|---|---|---|
| 3 MHz | 15 | 15 | 14 | 13 | 12 | 11 | 10 | 75 |
| 5 MHz | 25 | 25 | 24 | 23 | 22 | 21 | 20 | 135 |
| 10 MHz | 50 | 50 | 49 | 48 | 47 | 46 | 45 | 285 |
| 15 MHz | 75 | 75 | 74 | 73 | 72 | 71 | 70 | 435 |
| 20 MHz | 100 | 100 | 99 | 98 | 97 | 96 | 95 | 585 |

It can be learned by comparison between Table 4 and Table 3 that, only when the bandwidth is 75 RBs, a quantity of bits of a current resource block allocation field can meet a requirement on flexible resource allocation of the starting RB in the full uplink bandwidth. In addition to the bandwidth of 75 RBs, the quantity of bits of the current resource block allocation field is insufficient. Therefore, only a portion of states can be indicated for each type of bandwidth.

The following Table 5 shows quantities of states that can be indicated based on the resource allocation scheme of Rel-13 DCI format 6-0A in cases of different bandwidths and different lengths L of allocated consecutive RBs. A calculation method is as follows: In this solution, a flexible starting RB can be indicated only in a narrowband. Therefore, in each narrowband, when the length of the allocated consecutive RBs is L (where a value range is 1 to 6), a possible starting RB position is 0, 1, . . . , or 6-L, and a total quantity of possibly indicated states is 6-L. In this case, the quantity of states that can be indicated in the entire system bandwidth is a sum of quantities of states indicated in all the narrowbands.

TABLE 5

| System bandwidth | Total quantity of PRBs | Quantity of narrowbands | L = 1 | L = 2 | L = 3 | L = 4 | L = 5 | L = 6 |
|---|---|---|---|---|---|---|---|---|
| 3 MHz | 15 | 2 | 12 | 10 | 8 | 6 | 4 | 2 |
| 5 MHz | 25 | 4 | 24 | 20 | 16 | 12 | 8 | 4 |
| 10 MHz | 50 | 8 | 48 | 40 | 32 | 24 | 16 | 8 |
| 15 MHz | 75 | 12 | 72 | 60 | 48 | 36 | 24 | 12 |
| 20 MHz | 100 | 16 | 96 | 80 | 64 | 48 | 32 | 16 |

The following Table 6 shows a difference between a quantity of states required in a flexible starting RB indication method in a full bandwidth and a quantity of states that can be indicated in a current indication method in Rel-13.

TABLE 6

| System bandwidth | Total quantity of PRBs | Quantity of narrowbands | L = 1 | L = 2 | L = 3 | L = 4 | L = 5 | L = 6 |
|---|---|---|---|---|---|---|---|---|
| 3 MHz | 15 | 2 | 3 | 4 | 5 | 6 | 7 | 8 |
| 5 MHz | 25 | 4 | 1 | 4 | 7 | 10 | 13 | 16 |
| 10 MHz | 50 | 8 | 2 | 9 | 16 | 23 | 30 | 37 |
| 15 MHz | 75 | 12 | 3 | 14 | 25 | 36 | 47 | 58 |
| 20 MHz | 100 | 16 | 4 | 19 | 34 | 49 | 64 | 79 |

It can be learned from Table 6 that a smaller length of the allocated consecutive RBs indicates a smaller difference between the quantity of states required in the flexible starting RB indication method in the full bandwidth and the quantity of states that can be indicated in Rel-13 DCI. In other words, when L=1, most states can be indicated in the resource indication mode of Rel-13 DCI format 6-0A, and few states cannot be indicated. However, when the length of the allocated RBs is relatively large, the difference between the two quantities of states is increasingly large, indicating that there are many states that cannot be indicated in the resource indication mode of Rel-13 DCI format 6-0A. In addition, it can be learned from the foregoing analysis that the quantity of states that can be indicated by the TDD resource block allocation field is less than the quantity of states required in the flexible starting RB indication method in the full bandwidth, and only a portion of states can be indicated. Therefore, a portion of the resource block allocation field needs to be used to indicate a case in which the length of the allocated RBs is relatively large. In this way, the quantity of states that cannot be indicated can be minimized, and flexibility of resource allocation can be maximized. That is, states when L=2 to 6 need to be indicated.

As shown in Table 7, the last two columns show a total quantity of states when L=2 to 6 and a total quantity of states that can be indicated by the resource allocation field when the flexible starting RB is indicated in the full bandwidth. It can be learned that the states that can be indicated by the resource allocation field include all states when the flexible starting RB is indicated in the full bandwidth.

TABLE 7

| System bandwidth | Total quantity of PRBs | L = 2 | L = 3 | L = 4 | L = 5 | L = 6 | Total quantity of states | Quantity of states that can be indicated by a resource block allocation field |
|---|---|---|---|---|---|---|---|---|
| 3 MHz | 15 | 14 | 13 | 12 | 11 | 10 | 60 | 64 |
| 5 MHz | 25 | 24 | 23 | 22 | 21 | 20 | 110 | 128 |
| 10 MHz | 50 | 49 | 48 | 47 | 46 | 45 | 235 | 256 |
| 15 MHz | 75 | 74 | 73 | 72 | 71 | 70 | 360 | 512 |
| 20 MHz | 100 | 99 | 98 | 97 | 96 | 95 | 485 | 512 |

To minimize a change to an RIV value and reduce complexity of implementation by a user and power consumption, when L=2 to 6, this embodiment of this application provides the following solution. For the uplink resource allocation type 0, resources are allocated by using a resource indication value. A specific method is as follows:

The resource indication value may indicate a starting resource block ($RB_{start}$) of the allocated resources and a length $L_{CRBs}$ of consecutive resource blocks. A corresponding resource indication value may be represented as follows: If $(L_{CRBs}-1) \leq \lfloor N_{RB}^{UL}/2 \rfloor$, $RIV=N_{RB}^{UL}(L_{CRBs}-1)+RB_{START}$. Otherwise, $RIV=N_{RB}^{UL}(N_{RB}^{UL}-L_{CRBs}+1)+(N_{RB}^{UL}-1-RB_{start})$, where $N_{RB}^{UL}$ is an uplink bandwidth (represented by a quantity of RBs).

Figures 6, 7:
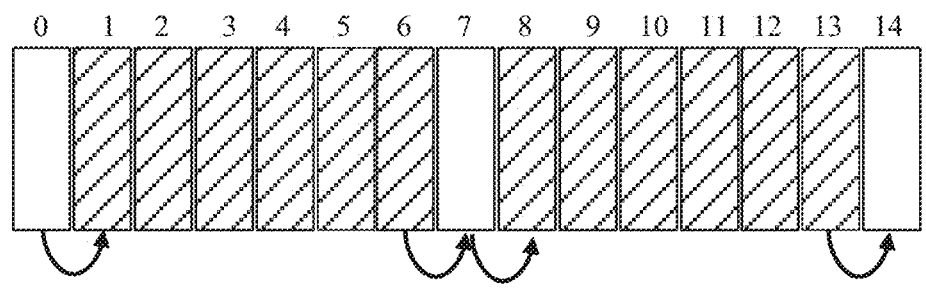
FIG. 6 is a schematic diagram of resource allocation when an uplink bandwidth is 15 RBs according to an embodiment of this application.
FIG. 7 is a schematic diagram of resource allocation in which resources cannot be flexibly allocated when an uplink bandwidth is 15 RBs according to an embodiment of this application.

FIG. 6 is a schematic diagram of resource allocation when an uplink bandwidth is 15 RBs according to an embodiment of this application. When $(L_{CRBs}-1) \leq \lfloor N_{RB}^{UL}/2 \rfloor$, an RIV value of an allocated starting RB 0 is an integer multiple of $N_{RB}^{UL}$. When a value of $L_{CRBs}$ is fixed, the RIV value increases in ascending order with an increase of $RB_{start}$. Therefore, each time the length of the allocated RB increases by 1, the RIV value increases by $N_{RB}^{UL}$ accordingly. For MTC, only a case in which $2 \leq L_{CRBs} \leq 6$ is considered. When $L_{CRBs}=6$, a quantity of required RIV values is $N_{RB}^{UL}-5$. Therefore, a total quantity of RIV values is $4*N_{RB}^{UL}+N_{RB}^{UL}-5=5*N_{RB}^{UL}-5$. Table 8 shows a total quantity of all RIV values, a quantity of required bits, and a quantity of bits of a resource block allocation field of DCI format 6-0A when a length of allocated RBs ranges from 2 to 6 in each type of uplink bandwidth.

TABLE 8

| Bandwidth | 15 RBs | 25 RBs | 50 RBs | 75 RBs | 100 RBs |
|---|---|---|---|---|---|
| Total quantity of RIV values | 70 | 120 | 245 | 370 | 495 |
| Quantity of required bits | 7 | 7 | 8 | 9 | 9 |
| Quantity of bits of a resource block allocation field | 6 | 7 | 8 | 9 | 9 |

It can be learned from Table 8 that the quantity of bits of the resource block allocation field in the DCI is insufficient only when the bandwidth is 15 RBs. When the length of the allocated RBs is 2, and when resources are allocated to the UE based on the resource allocation scheme of Rel-13 DCI format 6-0A, FIG. 7 is a schematic diagram of resource allocation in which resources cannot be flexibly allocated when an uplink bandwidth is 15 RBs according to an embodiment of this application, and there are four flexible allocation modes that cannot be indicated when the starting resource blocks are 0, 6, 7, and 13 respectively.

Therefore, when the bandwidth is 15 RBs, a value of $L_{CRBs}=3$ to 6 may be indicated by using an RIV value, and there is a total of $4*15=60$ states. However, there are a total of 8 bits of the resource block allocation field that can indicate $2^8=64$ states, where the four more states can exactly indicate four states that cannot be indicated based on the resource allocation scheme of Rel-13 DCI format 6-0A when $L_{CRBs}=2$. In this way, changes to an RIV formula can be minimized, complexity of determining the RIV value by a base station can be reduced, and complexity of determining a starting resource block and a length for resource allocation by a user based on the RIV value can be reduced.

The base station indicates one resource indication value to user equipment by using the resource block allocation field. Therefore, the base station determines the resource indication value based on the determined quantity of resource blocks and the determined index of the starting resource block. In addition, the $$\left\lceil \log_2 \left\lfloor \frac{N_{RB}^{UL}}{6} \right\rfloor \right\rceil + 5 \text{ bits}$$

of the resource block allocation field are used to indicate the resource indication value.

For the UE, after receiving the resource block allocation field, the UE determines the resource indication value based on the received resource block allocation field, and can easily determine, based on the resource indication value, the quantity of resource blocks allocated by the base station and the index of the starting resource block allocated by the base station.

In this embodiment of this application, the base station can determine the first resource indication value based on the determined quantity of resource blocks and the determined index of the starting resource block. The resource block allocation field indicates the first resource indication value. The UE can simply and quickly determine, based on the first resource indication value, the quantity of resource blocks allocated by the base station and the index of the starting resource block allocated by the base station, to more flexibly indicate to-be-used resources to the UE in a full bandwidth without changing a size of the resource block allocation field.

The following provides a method for numbering the first resource indication value and a method for determining the first resource indication value. One method for numbering the first resource indication value is preset by the base station or a system.

The first resource indication value(s) may be numbered by using the following method.

When the uplink bandwidth is greater than 15 RBs, the first resource indication value(s) corresponding to LCs that is greater than or equal to 2 are numbered.

The first resource indication value(s) corresponding to $L_{CRBs}=2$ are numbered in ascending order according to $0+RB_{START}$;

the first resource indication value(s) corresponding to $L_{CRBs}=3$ are numbered in ascending order according to $N_{RB}^{UL}+RB_{START}$;

the first resource indication value(s) corresponding to $L_{CRBs}=4$ are numbered in ascending order according to $2*N_{RB}^{UL}+RB_{START}$;

the first resource indication value(s) corresponding to $L_{CRBs}=5$ are numbered in ascending order according to $3*N_{RB}^{UL}+RB_{START}$; and the first resource indication value(s) corresponding to $L_{CRBs}=6$ are numbered in ascending order according to $4*N_{RB}^{UL}+RB_{START}$, where $N_{RB}^{UL}$ is a quantity of resource blocks included in the uplink bandwidth. $L_{CRBs}$ is a quantity of resource blocks allocated by the base station, and $RB_{START}$ is an index of the starting resource block allocated by the base station.

When the uplink bandwidth is equal to 15 RBs, the first resource indication value(s) corresponding to $L_{CRBs}$ that is greater than or equal to 2 are numbered.

The first resource indication value(s) corresponding to $L_{CRBs}=3$ are numbered in ascending order according to $0+RB_{START}$;

the first resource indication value(s) corresponding to $L_{CRBs}=4$ are numbered in ascending order according to $N_{RB}^{UL}+RB_{START}$;

the first resource indication value(s) corresponding to $L_{CRBs}=5$ are numbered in ascending order according to $2*N_{RB}^{UL}+RB_{START}$;

the first resource indication value(s) corresponding to $L_{CRBs}=6$ are numbered in ascending order according to $3*N_{RB}^{UL}+RB_{START}$; and the first resource indication value(s) corresponding to $L_{CRBs}=2$ are numbered in ascending order according to $4*N_{RB}^{UL}+RB_{START2}$, and $RB_{START2}$ is equal to 0, 1, 2, or 3.

$N_{RB}^{UL}$ is a quantity of resource blocks included in the uplink bandwidth. $L_{CRBs}$ is a quantity of resource blocks allocated by the base station. $RB_{START}$ is an index of a starting resource block allocated by the base station when $L_{CRBs}=3$, and $RB_{START2}$ is a first starting value corresponding to $L_{CRBs}=2$. A correspondence between the first starting value and the index $RB_{START}$ ($RB_{START}=0, 6, 7$, or 13) of the starting resource block allocated by the base station is shown in Table 2. It should be noted that a relationship between $RB_{START2}$ and the index $RB_{START}$ of the starting resource block allocated by the base station may not be unique.

The terminal device uses the following method for determining the first resource indication value. The method for determining the first resource indication value is related to the method for numbering the first resource indication value. It should be noted that the following formula is merely an example. Any formula variation for obtaining a result the same as that obtained according to the example formula falls in the protection scope of the embodiments of this application. That is, the first resource indication value is the same as a result calculated according to the following formula.

The first resource indication value(s) are numbered by using the following method.

When the uplink bandwidth is greater than 15 RBs, the first resource indication value is equal to $N_{RB}(L_{CRBs}-2)+RB_{START}$.

$N_{RB}$ has a same meaning as $N_{RB}^{UL}$. A value of $N_{RB}$ is equal to a quantity of RBs included in the uplink bandwidth, $L_{CRBs}$ is a quantity of resource blocks allocated by the base station, and $RB_{START}$ is an index of a starting resource block allocated by the base station.

A PRB length determined by the UE is floor(RIV/$N_{RB}$)+2, where RIV indicates the first resource indication value, and floor(x) means rounding x down, that is, rounding x down to an integer less than or equal to x.

A starting RB is mod(RIV, $N_{RB}$), where mod(x, y) indicates a remainder obtained by dividing x by y.

When the uplink bandwidth is equal to 15 RBs, and $3 \le L_{CRBs} \le 6$, the first resource indication value is equal to $N_{RB}(L_{CRBs}-3)+RB_{START}$.

The first resource indication value(s) corresponding to $L_{CRBs}=2$ are numbered in ascending order according to $4*N_{RB}+RB_{START2}$, and $RB_{START2}$ is equal to 0, 1, 2, or 3.

$N_{RB}$ is a quantity of resource blocks included in the uplink bandwidth, $L_{CRBs}$ is a quantity of resource blocks allocated by the base station, $RB_{START}$ is an index of a starting resource block allocated by the base station when $L_{CRBs}=3$, and $RB_{START2}$ is a first starting value corresponding to $L_{CRBs}=2$. A correspondence between the first starting value and the index $RB_{START}$ ($RB_{START}=0, 6, 7$, or 13) of the starting resource block allocated by the base station is shown in Table 2. It should be noted that a relationship between $RB_{START2}$ and the index $RB_{START}$ of the starting resource block allocated by the base station may not be unique. Herein, the value of $N_{RB}$ is equal to the quantity of RBs included in the uplink bandwidth, $L_{CRBs}$ is the quantity of resource blocks allocated by the base station, and $RB_{START}$ is the index of the starting resource block allocated by the base station.

The following provides an example from a perspective of a base station. The base station determines a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits,}$$

and N is an uplink bandwidth configuration.

The base station determines the first resource indication value by using the foregoing method. Details are not described herein again.

The following provides an example from a perspective of UE. The UE obtains a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits,}$$

and $N_{RB}^{UL}$ is an uplink bandwidth configuration.

When a flexible starting PRB is enabled by a higher layer for BL/CE UE, the BL/CE UE determines a first resource indication value indicated by the resource block allocation field. The BL/CE UE determines, based on the first resource indication value, a quantity of resource blocks allocated by a base station to the user equipment and an index of a starting resource block. The determining method is as described above.

The BL/CE UE determines, based on the determined quantity of resource blocks and the index of the starting resource block, the resource blocks allocated by the base station to the user equipment, and sends a PUSCH on the allocated resource blocks.

When a flexible starting PRB is not enabled by a higher layer for BL/CE UE, $$\left\lceil \log_2 \left\lfloor \frac{N_{RB}^{UL}}{6} \right\rfloor \right\rceil$$

most significant bits of the resource block allocation field indicate a narrowband, and 5 least significant bits of the resource block allocation field indicate that resources allocated based on an uplink resource allocation type 0 are used in the indicated narrowband.

Manner 1 of determining the first resource indication value by the UE: The first resource indication value is equal to a decimal number indicated by the $$\left\lceil \log_2 \left\lfloor \frac{N_{RB}^{UL}}{6} \right\rfloor \right\rceil + 5 \text{ bits.}$$

The UE determines, based on the first resource indication value, a quantity of resource blocks allocated by a base station to the user equipment and an index of a starting resource block.

According to the method provided in this embodiment of this application, the base station can determine the first resource indication value based on the determined quantity of resource blocks and the determined index of the starting resource block. The resource block allocation field indicates the first resource indication value. The UE can determine, based on the first resource indication value, the quantity of resource blocks allocated by the base station and the index of the starting resource block allocated by the base station, thereby improving flexibility of resource allocation without changing a size of the resource block allocation field in the DCI.

The following describes, by using an example, a resource allocation method in an FDD system that is provided in the embodiments of this application. A resource block allocation field has $$\left\lceil \log_2 \left\lfloor \frac{N_{RB}^{UL}}{6} \right\rfloor \right\rceil + 6 \text{ bits}$$

in total, and can indicate a relatively large quantity of states. When a length of allocated RBs is 1 to 6, in different bandwidths, a total quantity of states that need to be indicated, a quantity of required bits, and an actual quantity of bits of the resource block allocation field are shown in Table 9.

TABLE 9

| Bandwidth | 15 RBs | 25 RBs | 50 RBs | 75 RBs | 100 RBs |
|---|---|---|---|---|---|
| Total quantity of states | 75 | 135 | 285 | 435 | 585 |
| Quantity of required bits | 7 | 8 | 9 | 9 | 10 |
| Maximum RIV value | 85 | 145 | 295 | 445 | 595 |
| Quantity of required bits | 7 | 8 | 9 | 9 | 10 |
| Quantity of bits of a resource block allocation field | 7 | 8 | 9 | 9 | 10 |

It can be learned from Table 9 that, whether the total quantity of valid states or the total quantity of valid RIV values is used, the quantity of required bits is the same, and the quantity of bits of the resource block allocation field is sufficient. Then, a problem that needs to be resolved subsequently is how to determine, based on a bandwidth, the quantity of bits required by the resource block allocation field, and then a base station and a user may allocate and determine the resources based on the resource allocation type 0. However, different methods for determining the allocation field actually reflect different mapping schemes between the RIV value and the resource allocation scheme.

The following scheme is provided in the conventional technology: A quantity of valid states in a flexible starting PRB resource allocation method is $6*N_{RB}^{UL}-15$, and a size of a resource block allocation field is determined according to ceil(log 2($6*N_{RB}^{UL}-15$)), where ceil indicates rounding up, and log 2(x) indicates the logarithm of x to the base 2.

In the flexible starting PRB resource allocation scheme, an allocated PRB length may be one of 1 to 6, and the starting PRB is 0 to $N_{RB}^{UL}-1$. Therefore, a total quantity of all possible resource allocation states is $6*N_{RB}^{UL}-15$. If the size of the required resource allocation field is calculated based on the foregoing method, it implies that RIV values in a range of 0 to $6*N_{RB}^{UL}-14$ need to be in a one-to-one correspondence with $6*N_{RB}^{UL}-15$ resource allocation states during PRB resource allocation. This greatly changes a current RIV value determining scheme. According to the allocation scheme based on the resource allocation type 0, for a system with a bandwidth of $N_{RB}^{UL}$, when the allocated length ranges from 1 to 6, the required RIV value ranges from 0 to $6*N_{RB}^{UL}$. Therefore, new burden is caused to both the user and the base station, and for the user, decoding complexity is relatively high, and power consumption of the user is increased.

Based on this, this embodiment of this application provides the following scheme: A quantity of valid states in a flexible starting PRB resource allocation method is $6*N_{RB}^{UL}-15$, and when an RIV mapping relationship in a resource allocation type 0 in Rel-13 is not changed, a total quantity of valid RIV values is $6*N_{RB}^{UL}-5$. A size of a resource block allocation field is determined according to ceil(log 2($6*N_{RB}^{UL}$)), where ceil indicates rounding up, and log 2(x) indicates the logarithm of x to the base 2.

Compared with the scheme in the conventional technology, in this embodiment of this application, complexity of implementation by the user can be effectively reduced, and modifications to the RIV in a current protocol can be reduced. The scheme provided in this embodiment of this application is more concise during calculation of the quantity of bits, and calculation complexity is reduced.

In this embodiment of this application, a method for determining a size of a second resource indication field is as follows: For FDD MTC, the method for determining the size of the second resource indication field is: determining according to ceil(log 2($6*N_{RB}^{UL}$)), where ceil indicates rounding up, and log 2(x) indicates the logarithm of x to the base 2. $N_{RB}^{UL}$ is a system uplink bandwidth (represented by a quantity of RBs).

In this embodiment of this application, a method for determining a second resource indication value is as follows: An RIV value is determined based on a starting RB and a length of allocated consecutive RBs based on the mode of the resource allocation type 0.

According to the method provided in this embodiment of this application, the base station can determine a quantity of bits of the resource block allocation field based on the uplink bandwidth. The UE can determine the starting RB and the length of the allocated consecutive RBs more quickly by using the method.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that the embodiments described in this specification all belong to preferred embodiments, and the involved actions and modules are not necessarily required by this application.

To better implement the foregoing solutions in the embodiments of this application, the following further provides a related apparatus for implementing the foregoing solutions.

Figure 8:
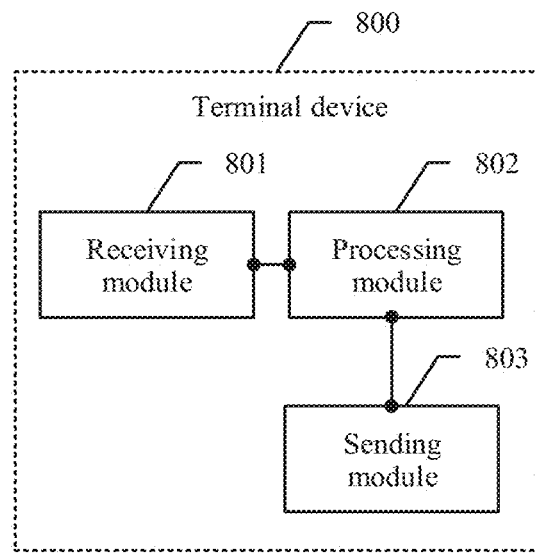
FIG. 8 is a schematic structural composition diagram of a terminal device according to an embodiment of this application.

FIG. 8 is a schematic structural composition diagram of a terminal device 800 according to an embodiment of this application. The terminal device 800 may include:

a receiving module 801, configured to receive downlink control information sent by a network device, where the downlink control information includes a resource allocation field, the resource allocation field includes $$\left\lceil \log_2 \left\lfloor \frac{N_{RB}^{UL}}{6} \right\rfloor \right\rceil + 5 \text{ bits,}$$

and $N_{RB}^{UL}$ indicates a quantity of resource blocks included in an uplink bandwidth, where when the resource allocation field indicates, based on a first resource allocation scheme, resource allocation in the uplink bandwidth, $$\left\lceil \log_2 \left\lfloor \frac{N_{RB}^{UL}}{6} \right\rfloor \right\rceil \text{bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in the narrowband for the terminal device, and a length of consecutive resource blocks allocated in the narrowband is N, where 1≤N≤6; or when the resource allocation field indicates, based on a second resource allocation scheme, resource allocation in the uplink bandwidth, the $$\left\lceil \log_2 \left\lfloor \frac{N_{RB}^{UL}}{6} \right\rfloor \right\rceil + 5 \text{ bits}$$

of the resource allocation field indicate a first resource indication value; a processing module 802, configured to: when determining, based on the second resource allocation scheme, resources allocated by the network device, determine the first resource indication value based on the resource allocation field, where the processing module 802 is configured to determine, based on the first resource indication value, a starting resource block allocated in the uplink bandwidth and a length $L_{CRBs}$ of consecutive resource blocks allocated in the uplink bandwidth, where M≤$L_{CRBs}$≤6, and M is a positive integer greater than 1; and a sending module 803, configured to send data on resources corresponding to the starting resource block and the length of the consecutive resource blocks.

Figure 9:
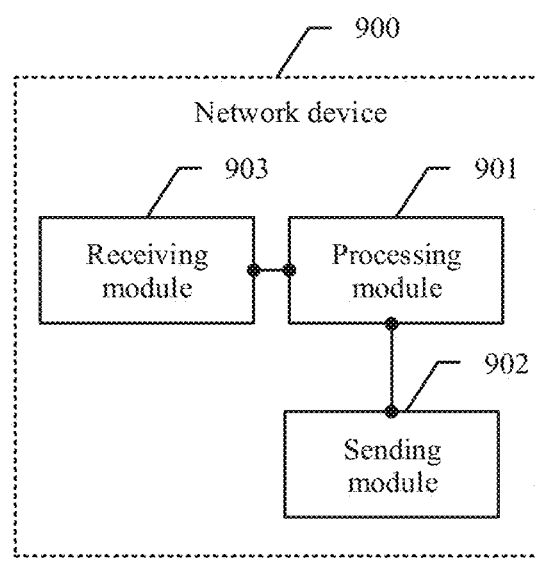
FIG. 9 is a schematic structural composition diagram of a network device according to an embodiment of this application.

As shown in FIG. 9, an embodiment of this application provides a network device 900, including:

a processing module 901, configured to determine a resource allocation scheme and a resource allocation field in downlink control information, where the resource allocation field includes $$\left\lceil \log_2 \left\lfloor \frac{N_{RB}^{UL}}{6} \right\rfloor \right\rceil + 5 \text{ bits},$$

and $N_{RB}^{UL}$ indicates a quantity of resource blocks included in an uplink bandwidth, where when resource allocation is determined to be performed in a first resource allocation scheme, the resource allocation field indicates, based on the first resource allocation scheme, resource allocation in the uplink bandwidth, the $$\left\lceil \log_2 \left\lfloor \frac{N_{RB}^{UL}}{6} \right\rfloor \right\rceil \text{bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in the narrowband for the terminal device, and a length of consecutive resource blocks allocated in the narrowband is N, where 1≤N≤6; or when resource allocation is determined to be performed in a second resource allocation scheme, the resource allocation field indicates, based on the second resource allocation scheme, resource allocation in the uplink bandwidth, and the $$\left\lceil \log_2 \left\lfloor \frac{N_{RB}^{UL}}{6} \right\rfloor \right\rceil + 5 \text{ bits}$$

of the resource allocation field indicate a first resource indication value, where the first resource indication value indicates a starting resource block allocated to the terminal device and a length $L_{CRBs}$ of consecutive resource blocks allocated to the terminal device, where M≤$L_{CRBs}$≤6, and M is a positive integer greater than 1;

a sending module 902, configured to send the downlink control information to the terminal device, and a receiving module 903, configured to receive, on resources corresponding to the starting resource block and the length of the consecutive resource blocks, data sent by the terminal device.

In some embodiments of this application, when the uplink bandwidth is six resource blocks, the resource allocation field indicates the resource allocation only in the first resource allocation scheme.

In some embodiments of this application, when the resource allocation field indicates, based on the second resource allocation scheme, the resource allocation in the uplink bandwidth, when the uplink bandwidth is 15 resource blocks, M=3; and/or when the uplink bandwidth is 25, 50, 75, or 100 resource blocks, M=2.

In some embodiments of this application, when the resource allocation field indicates, based on the second resource allocation scheme, the resource allocation in the uplink bandwidth, when the uplink bandwidth is 15, 25, 50, 75, or 100 resource blocks, M=2.

In some embodiments of this application, when the uplink bandwidth is 25, 50, 75, or 100 resource blocks, the first resource indication value is equal to $N_{RB}^{UL}$ ($L_{CRBs}$−2)+$RB_{START}$; where $N_{RB}^{UL}$ indicates the quantity of resource blocks included in the uplink bandwidth, $L_{CRBs}$ is the length of the allocated consecutive resource blocks, and $RB_{START}$ is an index of the allocated starting resource block.

In some embodiments of this application, when the uplink bandwidth is 15 resource blocks, and 3≤$L_{CRBs}$≤6, the first resource indication value is equal to $N_{RB}^{UL}$ ($L_{CRBs}$−3)+$RB_{START}$; and/or when the uplink bandwidth is 15 resource blocks, and $L_{CRBs}$=2, the first resource indication value is equal to 60+$RB_{START2}$, where $N_{RB}^{UL}$ indicates the quantity of resource blocks included in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

In some embodiments of this application, when the uplink bandwidth is 15 resource blocks, and $L_{CRBs}$=2, the first resource indication value is equal to $RB_{START2}$; and/or when the uplink bandwidth is 15 resource blocks, and 3≤$L_{CRBs}$≤6, the first resource indication value is equal to $N_{RB}^{UL}$ ($L_{CRBs}$−3)+$RB_{START}$+4, where $N_{RB}^{UL}$ indicates the quantity of resource blocks included in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

In some embodiments of this application, 0≤$RB_{START2}$≤3; and when $RB_{START2}$ is equal to 0, $RB_{START}$ is equal to 0; and/or
when $RB_{START2}$ is equal to 1, $RB_{START}$ is equal to 6; and/or
when $RB_{START2}$ is equal to 2, $RB_{START}$ is equal to 7; and/or
when $RB_{START2}$ is equal to 3. $RB_{START}$ is equal to 13.

In some embodiments of this application, the terminal device is a low-complexity terminal device and/or a terminal device in a coverage enhancement mode A.

It can be learned from the example description of this application in the foregoing embodiment that in the first resource allocation scheme, the narrowband is first indicated in the uplink bandwidth, and then the starting resource block and the length are indicated in the narrowband. In the second resource allocation scheme, the starting resource block and the length are indicated in the uplink bandwidth. Therefore, compared with the first resource allocation scheme, the second resource allocation scheme is more flexible, so that effective resources can be allocated to more UEs. and spectral efficiency is improved.

It should be noted that content such as information exchange between the modules/units of the apparatus and the execution processes thereof is based on the same idea as the method embodiments of this application, and achieves the same technical effects as the method embodiments of this application. For the specific content, refer to the foregoing description in the method embodiments of this application. Details are not described herein again.

An embodiment of this application further provides a computer storage medium. The computer storage medium stores a program. The program is executed to perform some or all of the steps described in the method embodiments.

Figure 10:
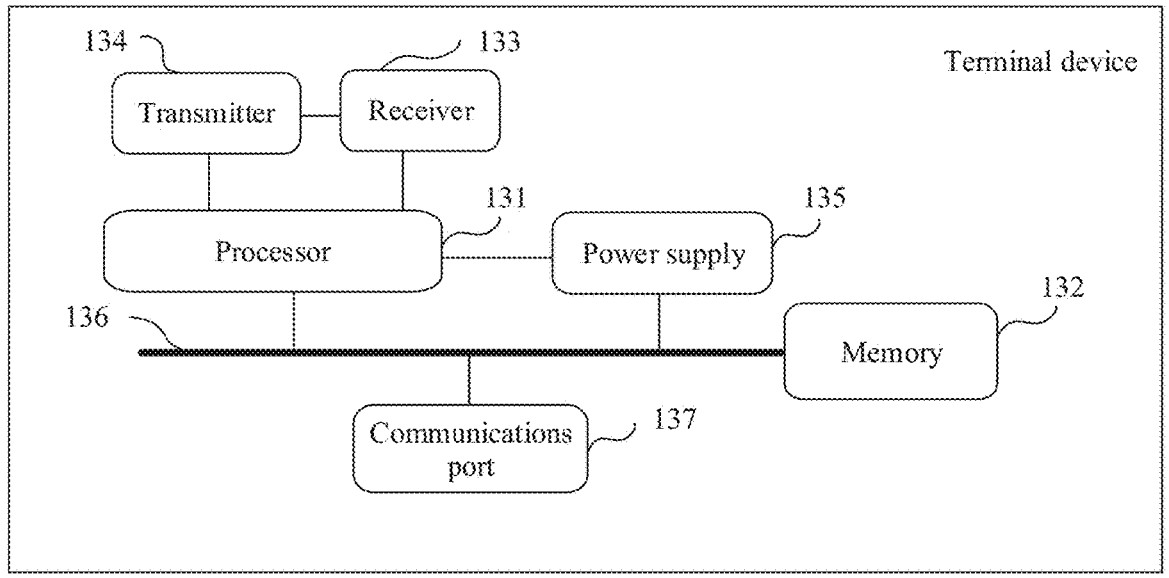
FIG. 10 is a schematic structural composition diagram of another terminal device according to an embodiment of this application.

FIG. 10 is a schematic structural diagram of another device according to an embodiment of this application. The device is a terminal device, and the terminal device may include a processor 131 (for example, a CPU), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed RAM memory, or may further include a nonvolatile memory NVM, for example, at least one magnetic disk memory. The memory 132 may store various instructions, to complete various processing functions and implement the method steps in the embodiments of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be a receive antenna and a transmit antenna that are independent of each other on the terminal device. The communications bus 136 is configured to implement communication connections between the components. The communications port 137 is configured to implement a connection and communication between the terminal device and another peripheral.

In this embodiment of this application, the memory 132 is configured to store computer-executable program code, and the program code includes an instruction. When the processor 131 executes the instruction, the instruction enables the processor 131 to perform a processing action of the terminal device in the foregoing method embodiments, and enables the transmitter 134 to perform a sending action of the terminal device in the foregoing method embodiments. Implementation principles and technical effects thereof are similar. Details are not described herein again.

In the foregoing embodiment of this application, a network device indicates, by using different values of bit states included in a resource allocation field, resources allocated to the terminal device. The resource allocation field includes $$\left\lceil \log_2 \left\lfloor \frac{N_{RB}^{UL}}{6} \right\rfloor \right\rceil + 5 \text{ bits.}$$

For example, the resource allocation field includes only the $$\left\lceil \log_2 \left\lfloor \frac{N_{RB}^{UL}}{6} \right\rfloor \right\rceil + 5 \text{ bits.}$$

The resource allocation field may indicate two different resource allocation schemes. When the first resource allocation field indicates, based on a first resource allocation scheme, resource allocation in an uplink bandwidth, the $$\left\lceil \log_2 \left\lfloor \frac{N_{RB}^{UL}}{6} \right\rfloor \right\rceil \text{bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in the narrowband for the terminal device, and a length of consecutive resource blocks allocated in the narrowband is N, where 1≤N≤6. When the resource allocation field indicates, based on a second resource allocation scheme, resource allocation in an uplink bandwidth, the $$\left\lceil \log_2 \left\lfloor \frac{N_{RB}^{UL}}{6} \right\rfloor \right\rceil + 5 \text{ bits}$$

of the resource allocation field indicate a first resource indication value, where the first resource indication value may be used by the terminal device to determine a starting resource block allocated in the uplink bandwidth and a length $L_{CRBs}$ of consecutive resource blocks allocated in the uplink bandwidth, where M≤$L_{CRBs}$≤6, and M is a positive integer greater than 1. In the first resource allocation scheme, the narrowband is first indicated in the uplink bandwidth, and then the starting resource block and the length are indicated in the narrowband. In the second resource allocation scheme, the starting resource block and the length are indicated in the uplink bandwidth. Therefore, compared with the first resource allocation scheme, the second resource allocation scheme is more flexible, so that effective resources can be allocated to more UEs, and spectral efficiency is improved.

Figure 11:
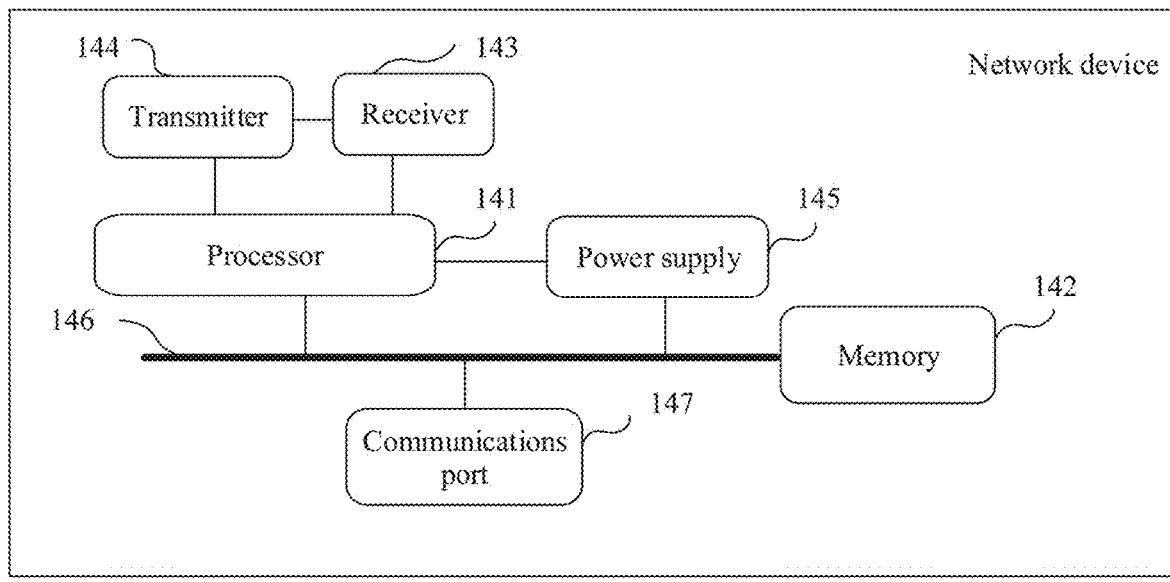
FIG. 11 is a schematic structural composition diagram of another network device according to an embodiment of this application.

FIG. 11 is a schematic structural diagram of another device according to an embodiment of this application. The device is a network device, and the network device may include a processor (for example, a CPU) 141, a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, or may further include a nonvolatile memory NVM, for example, at least one magnetic disk memory. The memory 142 may store various instructions, to complete various processing functions and implement the method steps in the embodiments of this application. Optionally, the network device in this embodiment of this application may further include one or more of a power supply 145, a communications bus 146, and a communications port 147. The receiver 143 and the transmitter 144 may be integrated into a transceiver of the network device, or may be a receive antenna and a transmit antenna that are independent of each other on the network device. The communications bus 146 is configured to implement communication connections between the components. The communications port 147 is configured to implement a connection and communication between the network device and another peripheral.

In the foregoing embodiment of this application, the network device indicates, by using different values of bit states included in a resource allocation field, resources allocated to a terminal device. The resource allocation field includes $$\left\lceil \log_2 \left\lfloor \frac{N_{RB}^{UL}}{6} \right\rfloor \right\rceil + 5 \text{ bits.}$$

For example, the resource allocation field includes only the $$\left\lceil \log_2 \left\lfloor \frac{N_{RB}^{UL}}{6} \right\rfloor \right\rceil + 5 \text{ bits.}$$

The resource allocation field may indicate two different resource allocation schemes. When the first resource allocation field indicates, based on a first resource allocation scheme, resource allocation in an uplink bandwidth, the $$\left\lceil \log_2 \left\lfloor \frac{N_{RB}^{UL}}{6} \right\rfloor \right\rceil \text{bits}$$

in the $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in the narrowband for the terminal device, and a length of consecutive resource blocks allocated in the narrowband is N, where 1≤N≤6. When the resource allocation field indicates, based on a second resource allocation scheme, resource allocation in an uplink bandwidth, the $$\left\lceil \log_2 \left\lfloor \frac{N_{RB}^{UL}}{6} \right\rfloor \right\rceil + 5 \text{ bits}$$

of the resource allocation field indicate a first resource indication value, where the first resource indication value may be used by the terminal device to determine a starting resource block allocated in the uplink bandwidth and a length $L_{CRBs}$ of allocated consecutive resource blocks allocated in the uplink bandwidth, where M≤$L_{CRBs}$≤6, and M is a positive integer greater than 1. In the first resource allocation scheme, the narrowband is first indicated in the uplink bandwidth, and then the starting resource block and the length are indicated in the narrowband. In the second resource allocation scheme, the starting resource block and the length are indicated in the uplink bandwidth. Therefore, compared with the first resource allocation scheme, the second resource allocation scheme is more flexible, so that effective resources can be allocated to more UEs, and spectral efficiency is improved.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the wireless transmission method according to any one of the possible implementations of the first aspect. Optionally, the storage unit is a storage unit in the chip, such as a register or a buffer, or the storage unit may be a storage unit in the terminal but outside the chip, such as a read-only memory (read-only memory, ROM), another type of static storage device capable of storing static information and an instruction, or a random access memory (random access memory, RAM).

The foregoing processor may be a general-purpose central processing unit (CPU), a microprocessor, an application-specific integrated circuit (application-specific integrated circuit, ASIC), or one or more integrated circuits for controlling program execution of the wireless communication method according to the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of this application without creative efforts.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A resource allocation method in a time division duplex (TDD) system, comprising:
    receiving, by a terminal device, downlink control information from a network device, wherein the downlink control information comprises a resource allocation field, wherein when a system bandwidth is 25, 50, 75, or 100 resource blocks, the resource allocation field comprises 7 bits, 8 bits, 9 bits, or 9 bits, respectively, and wherein:
        when the resource allocation field indicates, based on a first resource allocation scheme, resource allocation in an uplink bandwidth, $$\left\lceil \log_2 \left\lfloor \frac{N_{RB}^{UL}}{6} \right\rfloor \right\rceil \text{ bits}$$

in $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, wherein the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for the terminal device, wherein a length of consecutive resource blocks allocated in the narrowband is N, wherein 1≤N≤6, and wherein $N_{RB}^{UL}$ indicates a quantity of resource blocks comprised in the uplink bandwidth; or
        when the resource allocation field indicates, based on a second resource allocation scheme, resource allocation in an uplink bandwidth, the resource allocation field indicates a first resource indication value;

when the terminal device determines, based on the second resource allocation scheme, resources allocated by the network device, determining, by the terminal device, the first resource indication value based on the resource allocation field;
determining, by the terminal device based on the first resource indication value, a starting resource block allocated in the uplink bandwidth and a length $L_{CRBs}$ of consecutive resource blocks allocated in the uplink bandwidth, wherein $M \leq L_{CRBs} \leq 6$, and wherein M is a positive integer greater than 1; and
sending, by the terminal device, data on resources corresponding to the starting resource block and the length $L_{CRBs}$ of the consecutive resource blocks.

2. The method according to claim 1, wherein:
when the resource allocation field indicates, based on the second resource allocation scheme, the resource allocation in the uplink bandwidth, and when the uplink bandwidth is 25, 50, 75, or 100 resource blocks, M=2.

3. The method according to claim 1, wherein:
when the resource allocation field indicates, based on the second resource allocation scheme, the resource allocation in the uplink bandwidth, and when the uplink bandwidth is 15 resource blocks, M=2.

4. The method according to claim 3, wherein:
at least one of the following is true:
when $3 \leq L_{CRBs} \leq 6$, the first resource indication value is equal to $N_{RB}^{UL}(L_{CRBs}-3)+RB_{START}$; or
when $L_{CRBs}=2$, the first resource indication value is equal to $60+RB_{START2}$, wherein:
$N_{RB}^{UL}$ indicates the quantity of resource blocks comprised in the uplink bandwidth, $L_{CRBs}$ is a length of allocated consecutive resource blocks, $RB_{START}$ is an index of allocated starting resource block, and $RB_{START2}$ is a value correlated with $RB_{START2}$; or
at least one of the following is true:
when $L_{CRBs}=2$, the first resource indication value is equal to $RB_{START2}$; or
when $3 \leq L_{CRBs} \leq 6$, the first resource indication value is equal to $N_{RB}^{UL}(L_{CRBs}-3)+RB_{START}+4$, wherein:
$N_{RB}^{UL}$ indicates the quantity of resource blocks comprised in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

5. The method according to claim 1, wherein
the terminal device is at least one of a bandwidth-reduced low-complexity terminal device or a terminal device in a coverage enhancement mode A.

6. A data transmission method in a time division duplex (TDD) system, comprising:
determining, by a network device, a resource allocation scheme and a resource allocation field in downlink control information, wherein when a system bandwidth is 25, 50, 75, or 100 resource blocks, the resource allocation field comprises 7 bits, 8 bits, 9 bits, or 9 bits, respectively, and wherein:
when the network device determines to perform resource allocation in a first resource allocation scheme, the resource allocation field indicates, based on the first resource allocation scheme, resource allocation in an uplink bandwidth, wherein $$\left\lceil \log_2 \left\lfloor \frac{N_{RB}^{UL}}{6} \right\rfloor \right\rceil \text{ bits}$$

in $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, wherein the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for a terminal device, wherein a length of consecutive resource blocks allocated in the narrowband is N, wherein $1 \leq N \leq 6$, and wherein $N_{RB}^{UL}$ indicates a quantity of resource blocks comprised in the uplink bandwidth;
when the network device determines to perform resource allocation in a second resource allocation scheme, the resource allocation field indicates, based on the second resource allocation scheme, resource allocation in an uplink bandwidth, wherein the resource allocation field indicates a first resource indication value, wherein the first resource indication value indicates a starting resource block allocated to the terminal device and a length $L_{CRBs}$ of consecutive resource blocks allocated to the terminal device, wherein $M \leq L_{CRBs} \leq 6$, and wherein M is a positive integer greater than 1;
sending, by the network device, the downlink control information to the terminal device; and
receiving, by the network device on resources corresponding to the starting resource block and the length $L_{CRBs}$ of the consecutive resource blocks, data sent by the terminal device.

7. The method according to claim 6, wherein when the resource allocation field indicates, based on the second resource allocation scheme, the resource allocation in the uplink bandwidth, and when the uplink bandwidth is 25, 50, 75, or 100 resource blocks, M=2.

8. The method according to claim 7, wherein
the first resource indication value is equal to $N_{RB}^{UL}(L_{CRBs}-2)+RB_{START}$, wherein $N_{RB}^{UL}$ indicates the quantity of resource blocks comprised in the uplink bandwidth, $L_{CRBs}$ is a length of allocated consecutive resource blocks, and $RB_{START}$ is an index of allocated starting resource block.

9. The method according to claim 6, wherein when the resource allocation field indicates, based on the second resource allocation scheme, the resource allocation in the uplink bandwidth, and when the uplink bandwidth is 15 resource blocks, M=2.

10. The method according to claim 6, wherein
the terminal device is at least one of a bandwidth-reduced low-complexity terminal device or a terminal device in a coverage enhancement mode A.

11. A terminal device, comprising:
at least one processor; and
one or more memories coupled to the at least one processor and storing programming instructions for execution by the at least one processor to:
receive downlink control information from a network device, wherein the downlink control information comprises a resource allocation field, wherein when a system bandwidth is 25, 50, 75, or 100 resource blocks, the resource allocation field comprises 7 bits, 8 bits, 9 bits, or 9 bits, respectively, and wherein:
when the resource allocation field indicates, based on a first resource allocation scheme, resource allocation in an uplink bandwidth, $$\left\lceil \log_2 \left\lfloor \frac{N_{RB}^{UL}}{6} \right\rfloor \right\rceil \text{ bits}$$

in $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, wherein the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for the terminal device, wherein a length of consecutive resource blocks allocated in the narrowband is N, wherein 1≤N≤6, and wherein $N_{RB}^{UL}$ indicates a quantity of resource blocks comprised in the uplink bandwidth;
when the resource allocation field indicates, based on a second resource allocation scheme, resource allocation in an uplink bandwidth, the resource allocation field indicates a first resource indication value;
when determining, based on the second resource allocation scheme, resources allocated by the network device, determine the first resource indication value based on the resource allocation field;
determine, based on the first resource indication value, a starting resource block allocated in the uplink bandwidth and a length $L_{CRBs}$ of consecutive resource blocks allocated in the uplink bandwidth, wherein M≤$L_{CRBs}$≤6, and wherein M is a positive integer greater than 1; and
send data on resources corresponding to the starting resource block and the length $L_{CRBs}$ of the consecutive resource blocks.

12. The device according to claim 11, wherein when the resource allocation field indicates, based on the second resource allocation scheme, the resource allocation in the uplink bandwidth, and when the uplink bandwidth is 25, 50, 75, or 100 resource blocks, M=2.

13. The device according to claim 12, wherein
the first resource indication value is equal to $N_{RB}^{UL}$ ($L_{CRBs}$−2)+$RB_{START}$, wherein indicates the quantity of resource blocks comprised in the uplink bandwidth, $L_{CRBs}$ is a length of allocated consecutive resource blocks, and RB START is an index of allocated starting resource block.

14. The device according to claim 11, wherein when the resource allocation field indicates, based on the second resource allocation scheme, the resource allocation in the uplink bandwidth, and when the uplink bandwidth is 15 resource blocks, M=2.

15. The device according to claim 11, wherein
the terminal device is at least one of a bandwidth-reduced low-complexity terminal device or a terminal device in a coverage enhancement mode A.

16. A network device, comprising:
at least one processor; and
one or more memories coupled to the at least one processor and storing programming instructions for execution by the at least one processor to:
determine a resource allocation scheme and a resource allocation field in downlink control information, wherein when a system bandwidth is 25, 50, 75, or 100 resource blocks, the resource allocation field comprises 7 bits, 8 bits, 9 bits, or 9 bits, respectively, and wherein:
when resource allocation is determined to be performed in a first resource allocation scheme, the resource allocation field indicates, based on the first resource allocation scheme, resource allocation in an uplink bandwidth, wherein $$\left\lceil \log_2 \left\lfloor \frac{N_{RB}^{UL}}{6} \right\rfloor \right\rceil \text{ bits}$$

in $$\left\lceil \log_2 \left\lfloor \frac{N_{RB}^{UL}}{6} \right\rfloor \right\rceil + 5 \text{ bits}$$

of the resource allocation field indicate a narrowband index in the uplink bandwidth, wherein the 5 bits in the $$\left\lceil \log_2 \left\lfloor \frac{N_{RB}^{UL}}{6} \right\rfloor \right\rceil + 5 \text{ bits}$$

of the resource allocation field indicate resource allocation in a narrowband for a terminal device, wherein a length of consecutive resource blocks allocated in the narrowband is N, wherein 1≤N≤6, and wherein $N_{RB}^{UL}$ indicates a quantity of resource blocks comprised in the uplink bandwidth;
when resource allocation is determined to be performed in a second resource allocation scheme, the resource allocation field indicates, based on the second resource allocation scheme, resource allocation in an uplink bandwidth, wherein the resource allocation field indicates a first resource indication value, wherein the first resource indication value indicates a starting resource block allocated to the terminal device and a length $L_{CRBs}$ of consecutive resource blocks allocated to the terminal device, wherein M≤$L_{CRBs}$≤6, and wherein M is a positive integer greater than 1;
send the downlink control information to the terminal device; and
receive, on resources corresponding to the starting resource block and the length $L_{CRBs}$ of the consecutive resource blocks, data sent by the terminal device.

17. The device according to claim 16, wherein when the resource allocation field indicates, based on the second resource allocation scheme, the resource allocation in the uplink bandwidth, and when the uplink bandwidth is 25, 50, 75, or 100 resource blocks, M=2.

18. The device according to claim 16, wherein when the resource allocation field indicates, based on the second resource allocation scheme, the resource allocation in the uplink bandwidth, and when the uplink bandwidth is 15 resource blocks, M=2.

19. The device according to claim 18, wherein:

at least one of the following is true:

when $3 \leq L_{CRBs} \leq 6$, the first resource indication value is equal to $N_{RB}^{UL} (L_{CRBs}-3)+RB_{START}$; or when $L_{CRBs}=2$, the first resource indication value is equal to $60+RB_{START2}$, wherein:

$N_{RB}^{UL}$ indicates the quantity of resource blocks comprised in the uplink bandwidth, $L_{CRBs}$ is a length of allocated consecutive resource blocks, $RB_{START}$ is an index of allocated starting resource block, and $RB_{START2}$ is a value correlated with $RB_{START}$; or at least one of the following is true:

when $L_{CRBs}=2$, the first resource indication value is equal to $RB_{START2}$; or when $3 \leq L_{CRBs} \leq 6$, the first resource indication value is equal to $N_{RB}^{UL} (L_{CRBs}-3)+RB_{START}+4$, wherein:

$N_{RB}^{UL}$ indicates the quantity of resource blocks comprised in the uplink bandwidth, $L_{CRBs}$ is the length of the allocated consecutive resource blocks, $RB_{START}$ is an index of the allocated starting resource block, and $RB_{START2}$ is a value correlated with $RB_{START}$.

20. The device according to claim 16, wherein the terminal device is at least one of a bandwidth-reduced low-complexity terminal device or a terminal device in a coverage enhancement mode A.

* * * * *

UNITED STATES PATENT AND TRADEMARK OFFICE
CERTIFICATE OF CORRECTION

PATENT NO. : 12,003,466 B2
APPLICATION NO. : 17/172188
DATED : June 4, 2024
INVENTOR(S) : Zheng Yu et al.

It is certified that error appears in the above-identified patent and that said Letters Patent is hereby corrected as shown below:

On the Title Page

In Column 2 (item (57) Abstract), In Line 10, Delete "L CRP, s" and insert -- $L_{CRBs}$ --.

In Column 2 (item (57) Abstract), In Line 17, After "V2X," insert -- LTE-V, --.

In Column 2 (item (57) Abstract), In Line 18, Delete "DE-M," and insert -- LTE-M, --.

In the Claims

In Column 41, In Line 27 (Approx.), In Claim 4, delete "($L_{CRBs}$,–3)" and insert -- ($L_{CRBs}$–3) --.

In Column 41, In Line 34 (Approx.), In Claim 4, delete "$RB_{START2}$;" and insert -- $RB_{START}$; --.

In Column 42, In Line 45-46, In Claim 8, delete "$N_{RB}^{UL}(L_{CRBs}–2)$" and insert -- $N_{RB}^{UL} (L_{CRBs}–2)$ --.

In Column 43, In Line 58, In Claim 13, after "wherein" insert -- $N_{RB}^{UL}$ --.

In Column 43, In Line 61, In Claim 13, delete "RB START" and insert -- $RB_{START}$ --.

Signed and Sealed this
Twenty-ninth Day of October, 2024

Katherine Kelly Vidal
*Director of the United States Patent and Trademark Office*